(12) United States Patent
Hulse

(10) Patent No.: US 7,331,697 B1
(45) Date of Patent: Feb. 19, 2008

(54) LED LIGHTING SYSTEM WITH HELICAL FIBER FILAMENT

(75) Inventor: George R. Hulse, Arlington Heights, IL (US)

(73) Assignee: iLight Technologies, Inc., Chicago, IL (US)

( * ) Notice: Subject to any disclaimer, the term of this patent is extended or adjusted under 35 U.S.C. 154(b) by 0 days.

(21) Appl. No.: 11/760,343

(22) Filed: Jun. 8, 2007

Related U.S. Application Data

(63) Continuation-in-part of application No. 11/482,412, filed on Jul. 7, 2006, now Pat. No. 7,241,039.

(60) Provisional application No. 60/697,781, filed on Jul. 8, 2005.

(51) Int. Cl.
*G02B 6/00* (2006.01)
*F21V 7/04* (2006.01)

(52) U.S. Cl. ..................... 362/551; 362/555

(58) Field of Classification Search .......... 362/551, 362/555, 568; 372/2–6; 359/337
See application file for complete search history.

(56) References Cited

U.S. PATENT DOCUMENTS

| | | | |
|---|---|---|---|
| 5,103,380 A * | 4/1992 | Lindner et al. ............ | 362/568 |
| 5,271,079 A | 12/1993 | Levinson | |
| 6,190,022 B1 | 2/2001 | Tocci et al. | |
| 6,496,301 B1 * | 12/2002 | Koplow et al. ............ | 359/337 |
| 6,650,664 B1 * | 11/2003 | Moore et al. .............. | 372/6 |
| 6,866,427 B2 | 3/2005 | Robbins | |
| 2004/0252940 A1 | 12/2004 | Atac et al. | |

OTHER PUBLICATIONS

International Searching Authority/US, International Search Report and Written Opinion for PCT/US06/26621, Apr. 24, 2007.

* cited by examiner

*Primary Examiner*—Quyen P Leung
(74) *Attorney, Agent, or Firm*—Stites & Harbison, PLLC; Jeffrey A. Haeberlin; David W. Nagle, Jr.

(57) ABSTRACT

A lighting system includes a helical light-transmitting fiber and a light source. The helical light-transmitting fiber is doped with a first wavelength converting material and defines a helical axis. The light source is aligned axially with the helical fiber such that a portion of any light emitted by the light source will pass through the open space between the turns of the first helical fiber and a portion of any light emitted by the light source will be received by the helical fiber and converted to light of a predetermined color. Adjustment of the compression of the helical fiber will adjust the mixture of light emitted by the system. The helical fiber may bias an illuminated button bulb upward in a housing, such that depressing the button bulb changes the color of the light that illuminates the button bulb.

14 Claims, 19 Drawing Sheets

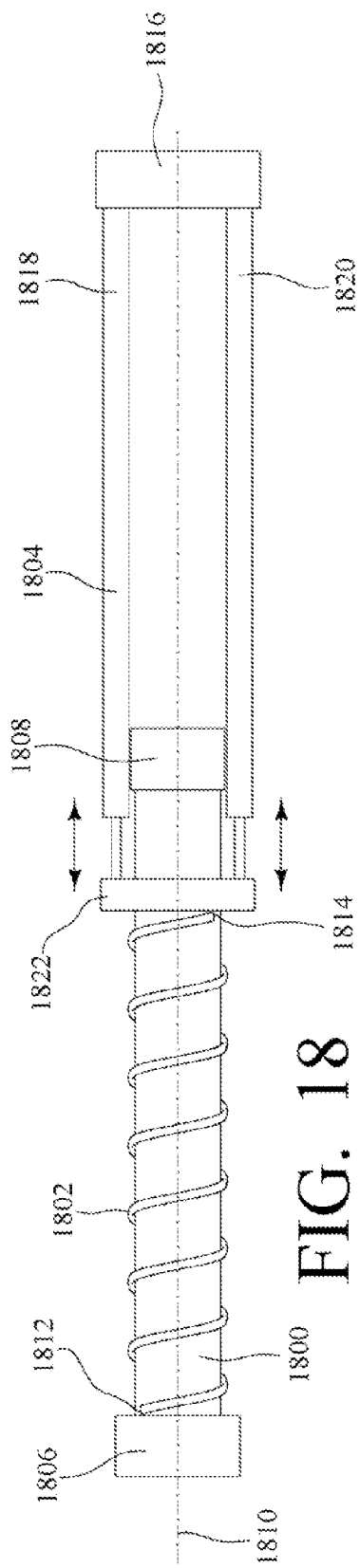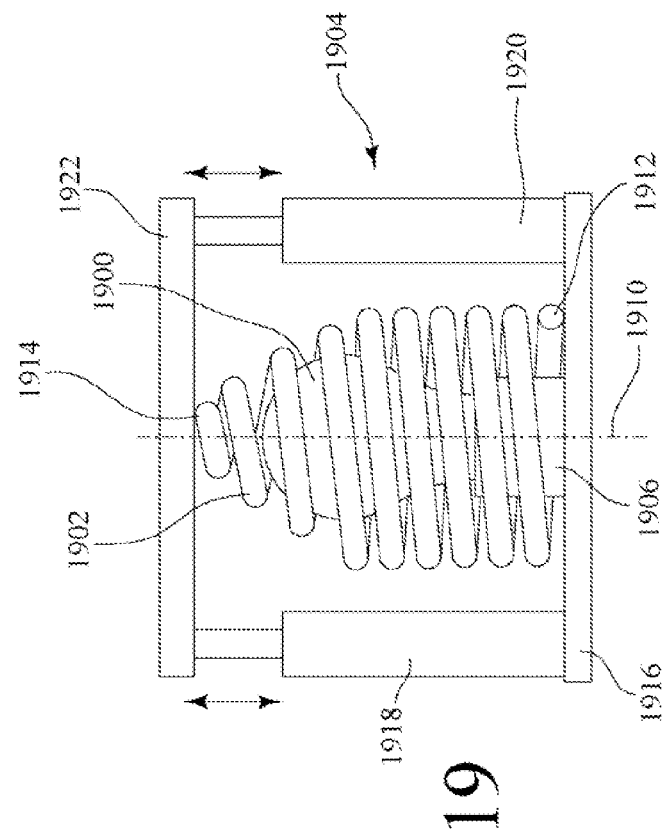
FIG. 18
FIG. 19

LED LIGHTING SYSTEM WITH HELICAL FIBER FILAMENT

CROSS-REFERENCE TO RELATED APPLICATIONS

The present application is a continuation-in-part of U.S. patent application Ser. No. 11/482,412, filed on Jul. 7, 2006, which claims priority to U.S. Provisional Patent Application Ser. No. 60/697,781 filed on Jul. 8, 2005, the entire disclosures of which are incorporated herein by reference.

BACKGROUND OF THE INVENTION

The present invention relates to a lighting system having a helical fiber "filament."

Lightweight, breakage resistant, high-intensity LEDs, have shown great promise to those interested in replacing conventional tungsten filament light sources. Nevertheless, a problem with such LEDs is that the available visible color spectrum is limited by the finite availability of LED colors. Therefore, in commonly assigned U.S. Pat. No. 7,011,421, and in commonly assigned and co-pending U.S. patent application Ser. No. 11/025,019, which are also incorporated in their entirety herein by this reference, illumination devices are described that uses fluorescent and phosphorescent dyes, thus allowing for emission of light in colors that cannot ordinarily be achieved by use of LEDs alone without significant increase in cost or complexity of the illumination device. However, it is further desirable to easily be able to adjust the color of the light emitted by such LED/dye systems.

Additionally, fluorescent dyes will migrate in a non-uniform illumination field. The non-uniform illumination field will cause dyes exposed to a higher intensity to vibrate and become "hot,", which then causes the dyes to migrate away from the higher intensity location. As the dyes migrate, the resulting color emitted by the LED/dye system will change. Thus, it is further desirable to reduce or eliminate dye migration in LED/dye systems.

It is further desirable to easily be able to adjust the color of light emitted by lighting systems employing linear fluorescent lamps, incandescent lamps, compact fluorescent lamps, metal halide lamps, and high-intensity discharge lamps.

It is further desirable to have an illuminated button bulb where the color of the light that illuminates the button bulb changes when the button bulb is depressed. For the purpose of this application, a "button bulb" shall be understood as defined below, but is generally an push-button-type device having an illuminated "bulb" that serves as the push-button.

BRIEF SUMMARY OF THE INVENTION

These needs, and others, are met by the invention.

Generally described, the invention is a lighting system including a first helical light-transmitting fiber and an LED. The first helical light-transmitting fiber is doped with a first wavelength converting material and defines a helical axis. The LED has a light-emitting portion for emitting light of a first color. The LED is aligned axially with the first helical fiber such that a portion of any light emitted by the LED will pass through the open space between the turns of the first helical fiber and a portion of any light emitted by the LED will be received by the first helical fiber and converted to light of a second color.

According to an aspect of the invention, the first helical fiber defines a cylindrical interior space and the LED is a side-emitting LED positioned with the light-emitting portion inside of the first helical fiber interior space. The system further has a cup-shaped light-collecting and mixing element having a side wall, a closed end, an open end, and an interior area. The light-collecting and mixing element is aligned axially within the first helical fiber such that the light-emitting portion of the LED and the first helical fiber are received with the light-collecting and mixing element interior area. The light-collecting and mixing element collects and mixes both the light of a first color and the light of a second color, and directs the mixed light out the open end. The system further includes a means of adjusting the compression of the first helical fiber for adjusting the amount of open space between the turns of the first helical fiber, thereby changing the percentages of the light of the first color and the light of the second color that are emitted by the lighting system.

More specifically, the means of adjusting the compression includes a first separating element and a first plunger assembly. The separating element may be a light-transmitting tube. The plunger assembly may include a threaded shaft and a threaded shaft-receiving nut. The LED may have a base portion connected at one end of the light-transmitting tube. The threaded nut may be connected at the other end of the light-transmitting tube. The first helical fiber is positioned in the interior of the light-transmitting tube. The threaded shaft is rotationally received in the threaded nut, with one end of the shaft adjacent one end of the first helical fiber, such that rotation of the threaded shaft will adjust the compression of the first helical fiber and the open space between the turns of the first helical fiber.

The lighting system may also have a light-transmitting element positioned around an outer portion of the light-transmitting tube, or a light-reflecting element positioned around a portion of the interior surface of the light-collecting and mixing element. Both the light-transmitting element and the light-reflecting element would contain a second wavelength converting material, for converting a portion of the light emitted by the LED to a third color.

According to another aspect of the invention, the lighting system further has a second helical fiber having a diameter larger than the diameter of the first helical fiber positioned around and axially aligned with the first helical fiber. The second helical fiber is doped with a second wavelength converting material. The lighting system may further have a means of adjusting the compression of the second helical fiber that includes a second light-transmitting tube and a tubular plunger slidingly received within the second light-transmitting tube.

According to another aspect of the invention, the lighting system has a toroidal light-transmitting member having optical waveguide and light-scattering properties, and a light-directing housing for guiding light from the LED and the first helical fiber into the toroidal light-transmitting member. The light-directing housing may have a disk-shaped top reflector member covering a top portion of an opening defined by the toroidal light-transmitting member. The top reflector member may further be flexible for adjusting the compression of the first helical fiber.

According to yet another aspect of the invention, the lighting system may have a light-transmitting rod positioned such that at least a portion of the light-transmitting rod is inside of the first helical fiber. The LED is a top-emitting LED and is positioned to emit light into a proximate end of the light-transmitting rod. A reflector caps a distal end of the rod. The rod could be bulb-shaped.

According to a further aspect of the invention, the lighting system may have a light-transmitting tube positioned such that at least a portion of the light-transmitting tube is inside of the first helical fiber. A reflector may be formed inside of the light-transmitting tube to direct light out the sides of the tube. The lighting system may further have a means, such as a solenoid, of adjusting the compression of the first helical fiber. Still further, the system may have multiple fibers doped with different wavelength converting materials wound in parallel or in sections around the light-transmitting tube.

Another aspect of the invention utilizes an LED having a batwing radiation pattern and a fiber formed in a substantially dome-shaped helix having an open top corresponding to a uniform central radiation region of the LED. A cap sized to fit is placed over the open top of the dome-shaped helical fiber.

In one further embodiment, a light-transmitting rod encases the first helical fiber. The light-transmitting rod and the first helical fiber are aligned co-axially, and a top-emitting LED is positioned to emit light into an end of the light-transmitting rod.

In yet another embodiment, a lighting system includes a helical light-transmitting fiber doped with a wavelength converting material and a light source, which could be a tubular lamp or bulbous lamp, axially aligned with the helical fiber. Compression means adjust the compression of the helical fiber, changing the amount of open space between the turns of the helical fiber and the percentages of light from the light source and converted light from the helical fiber that are emitted by the lighting system. The helical fiber may be cylindrical, conical, barrel-shaped, or hourglass shaped.

In another embodiment, an illuminated button bulb includes a housing, a light-transmitting button bulb element, a light source, and a helical light-transmitting fiber. The housing defines a cavity and an open top. The light-transmitting button bulb element has a base portion received in the cavity and restrained by the housing, and an upper portion that extends upwardly through the open top. The light source is positioned in the cavity. The helical fiber is positioned in the cavity around the light source, and is doped with a wavelength converting material. The helical fiber biases the light-transmitting button bulb upwardly. The helical fiber may be conically shaped, and may further include a light-transmitting disk member doped with a wavelength converting material and positioned at an apex of the conical helical fiber.

In a further embodiment, an illuminated button bulb includes an elongated housing, an elongated light-transmitting button bulb element, a plurality of light sources arranged linearly in the housing, and a plurality of helical light-transmitting fibers positioned in the housing cavity around each light source. The light sources may be LED light sources and the helical fibers may be conically shaped. The helical fibers bias the elongated button bulb element upwardly.

Better understanding may be had by referring to the following detailed description of exemplary embodiments and drawings.

BRIEF DESCRIPTION OF THE FIGURES

FIG. 18 is a side view of a lighting system using a tubular lamp and a helical fiber according to the invention.

FIG. 19 is a side view of a lighting system using a bulbous lamp and a helical fiber according to the invention.

DETAILED DESCRIPTION OF EXEMPLARY EMBODIMENTS OF THE INVENTION

A. First Exemplary Embodiment

Single Helical Fiber

Figure 1:
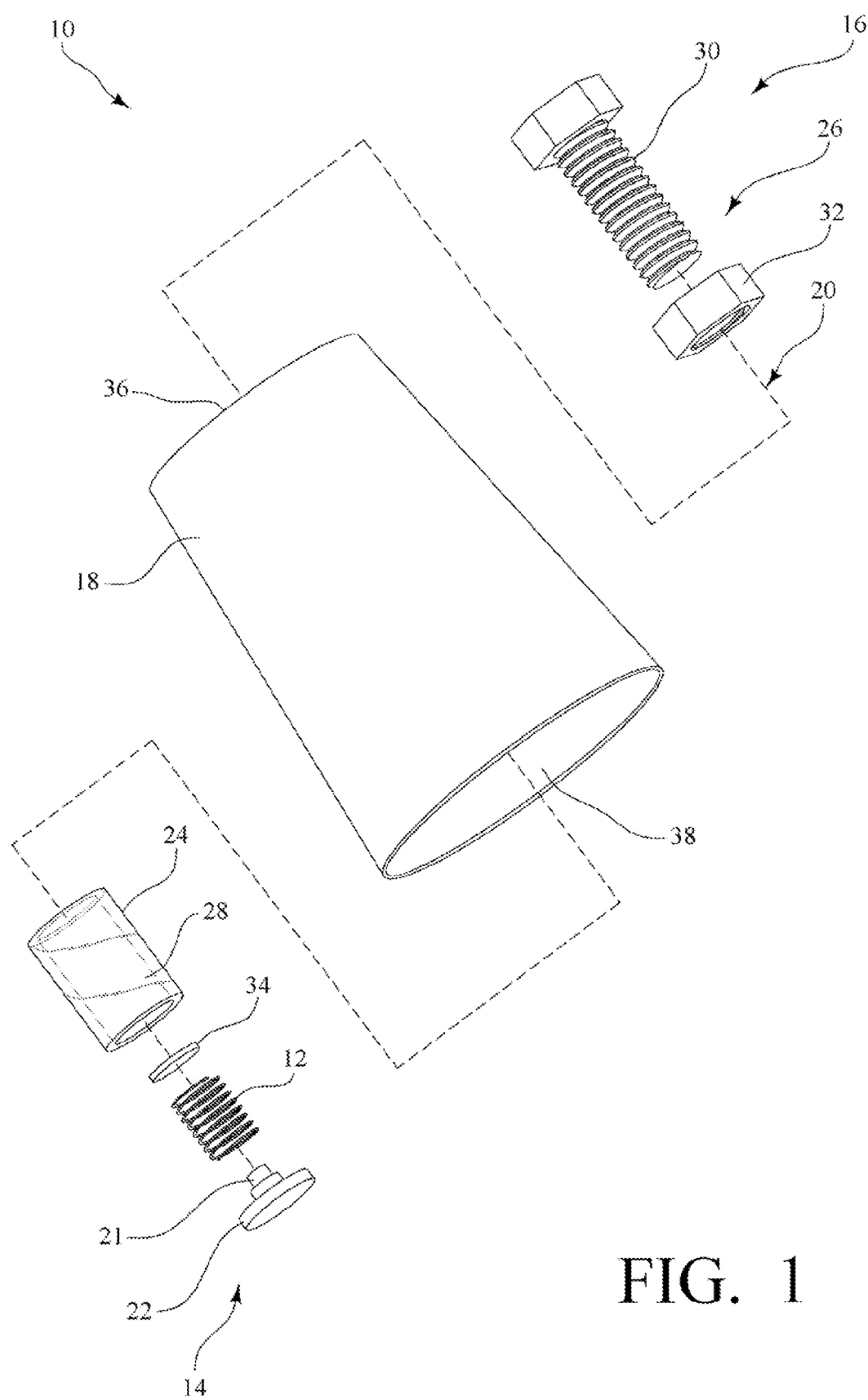
FIG. 1 is an exploded perspective view of a first exemplary embodiment of an LED lighting system having a helical fiber "filament" according to the invention.
Figure 2:
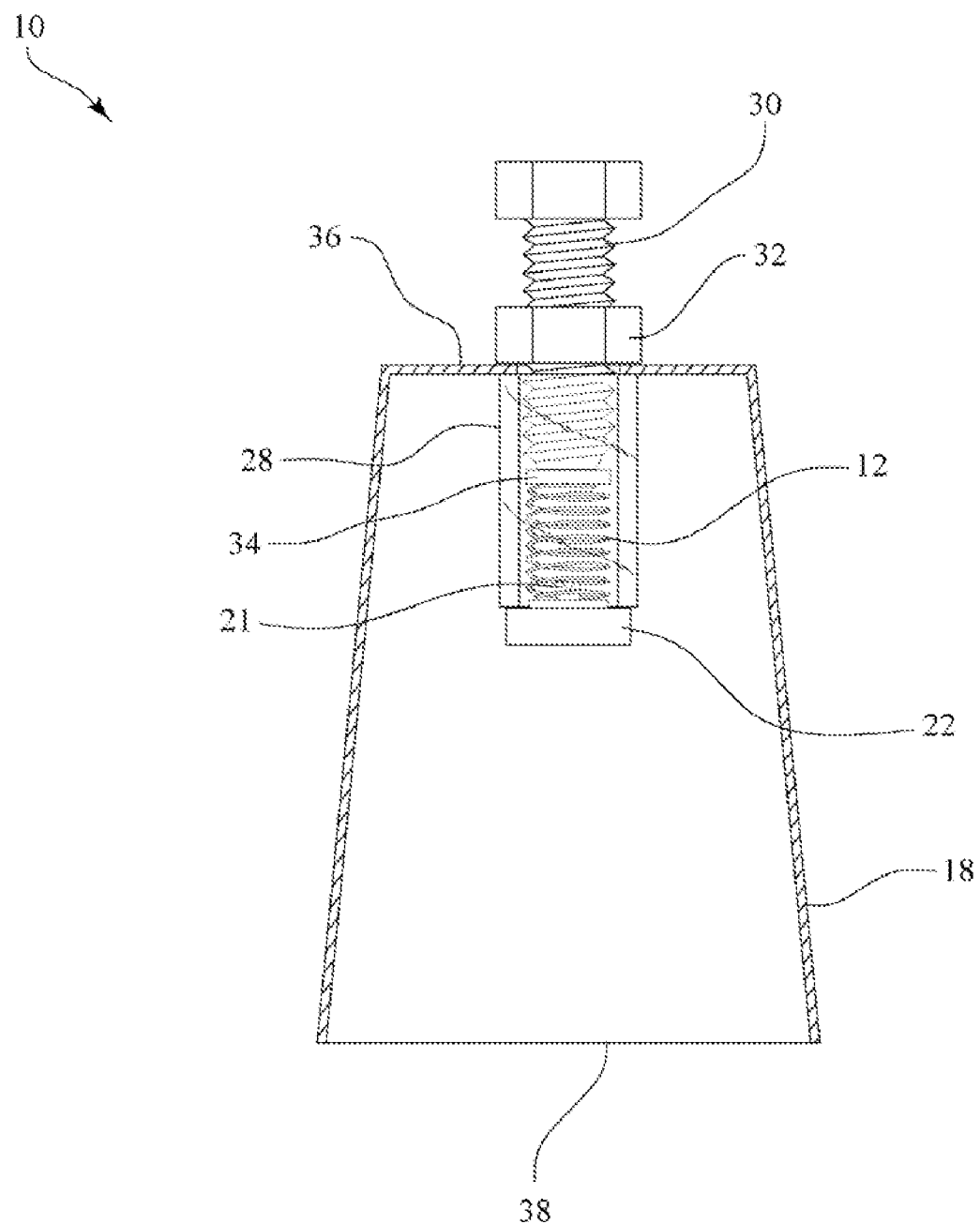
FIG. 2 is a side view of the first exemplary embodiment of an LED lighting system, with a portion of a light-collecting and mixing element cut away.

As shown in FIG. 1 and FIG. 2, a first exemplary embodiment 10 of an LED lighting system has a helical fiber 12, an LED 14, a means 16 of adjusting the compression of the helical fiber 12, and a light-collecting and mixing element 18.

The helical fiber 12 of the first exemplary embodiment is a light-transmitting fiber formed in the shape of a cylindrical coil, spiral or helix. The helical fiber 12 is doped with a wavelength converting material, such as a fluorescent or phosphorescent dye or pigment. The helical axis of the helical fiber 12 defines a central axis 20 of the LED lighting system 10. The helical fiber 12 may be made of either a clear or a frosted light-transmitting material, such as acrylic or the like.

The LED 14 of the first exemplary embodiment is a side-emitting LED. The LED 14 is aligned coaxially with the helical axis of the helical fiber 12 and the central axis 20 of the LED lighting system. Further, the LED 14 is positioned within the cylindrical interior space defined by the helical fiber 12. The LED 14 has a light-emitting portion 21 and a base portion 22. The LED base portion 22 provides for mechanical and electrical connection of the LED 14. Not shown, but known in the art, are components for operating the LED 14, including electrical wiring for supplying power to the LED 14, and any necessary heat sink elements for dissipating heat from the LED 14.

The means 16 of adjusting the compression of the helical fiber 12 of the first exemplary embodiment includes a separating element 24, a plunger assembly 26, and the LED base portion 22. The helical fiber 12 is positioned between the plunger assembly 26 and the LED base portion 22, with the separating element 24 separating the plunger assembly 26 from the LED base portion 22. More specifically, the separating element 24 of the first exemplary embodiment is a light-transmitting tube 28, and the plunger assembly 26 includes a threaded shaft 30 and a threaded shaft-receiving nut 32. The LED base portion 22 is connected at one end of the light-transmitting tube 28, positioning the LED light-emitting portion 21 in the interior of the light-transmitting tube 28. The threaded shaft-receiving nut 32 is connected at the other end of the light-transmitting tube 28. The helical fiber 12 is positioned in the interior of the light-transmitting tube 28, positioned around the LED light-emitting portion 21 and adjacent the LED base portion 22. The threaded shaft 30 is received in the threaded shaft-receiving nut 32 such that one end of the shaft 30 is adjacent the helical fiber 12. Additionally, the means 16 of adjusting the compression of the helical fiber may also have a disk member 34 positioned between the threaded shaft 30 and the helical fiber 12.

One of skill in the art will appreciate that other mechanical and electromechanical adjustment means, such as solenoids or the like, could be utilized for adjusting the compression of the helical fiber of the exemplary embodiments described herein without departing from the spirit or the scope of the invention described and claimed herein.

The light-collecting and mixing element 18 is cup-shaped and positioned coaxially with the central axis 20 of the LED lighting system 10 and around the LED light-emitting portion 21, the helical fiber 12 and a portion of the light-transmitting tube 28. The light-collecting and mixing element 18 has a closed end 36 and an open end 38. As shown in FIG. 1 and FIG. 2, the threaded shaft-receiving nut 32 may be attached to the outside of the closed end 36, and the closed end 36 may have an opening sized for allowing the threaded shaft 30 to protrude through the closed end 36 and into the interior of the light-collecting and mixing element 18.

In operation, the LED light-emitting portion 21 emits light of a first wavelength or color. A portion of the emitted light passes through the open space between the turns of the helical fiber 12, and a portion of the emitted light is received by the helical fiber 12 and converted to light of a second wavelength or color. The light-collecting and mixing element 18 collects and mixes both the light of a first color and the light of a second color, and directs the mixed light out the open end 38. Preferably, the LED 14 emits light having a wavelength in the blue region (relatively high energy and short wavelength) of the color spectrum, and the wavelength converting material in the helical fiber 12 converts a portion of the emitted light to a second color, such that the mixed light approximates the color and intensity of a conventional tungsten filament light source.

Advantageously, the plunger assembly 26 allows the open space between the turns of the helical fiber 12 to be adjusted by compressing or decompressing the helical fiber 12, thereby changing the percentages of the light of the first color and the light of the second color that are present in the mixed light, and the perceived color of the mixed light. Rotation of the threaded shaft 30 with respect to the threaded shaft-receiving nut 32 will cause compression or decompression of the helical fiber 12. The disk member 34 will prevent the helical fiber 12 from getting caught and twisted by the threaded shaft 30.

Also advantageously, the relatively small cross-sectional area of the fiber of the helical fiber 12 serves to lessen or eliminate any non-uniformity of the illumination field at any one point along the fiber, and thereby lessens or eliminates and dye migration that may occur as the result of the non-uniformity of the illumination field.

B. Second Exemplary Embodiment

Light-Transmitting Element Around Light-Transmitting Tube

Figure 3:
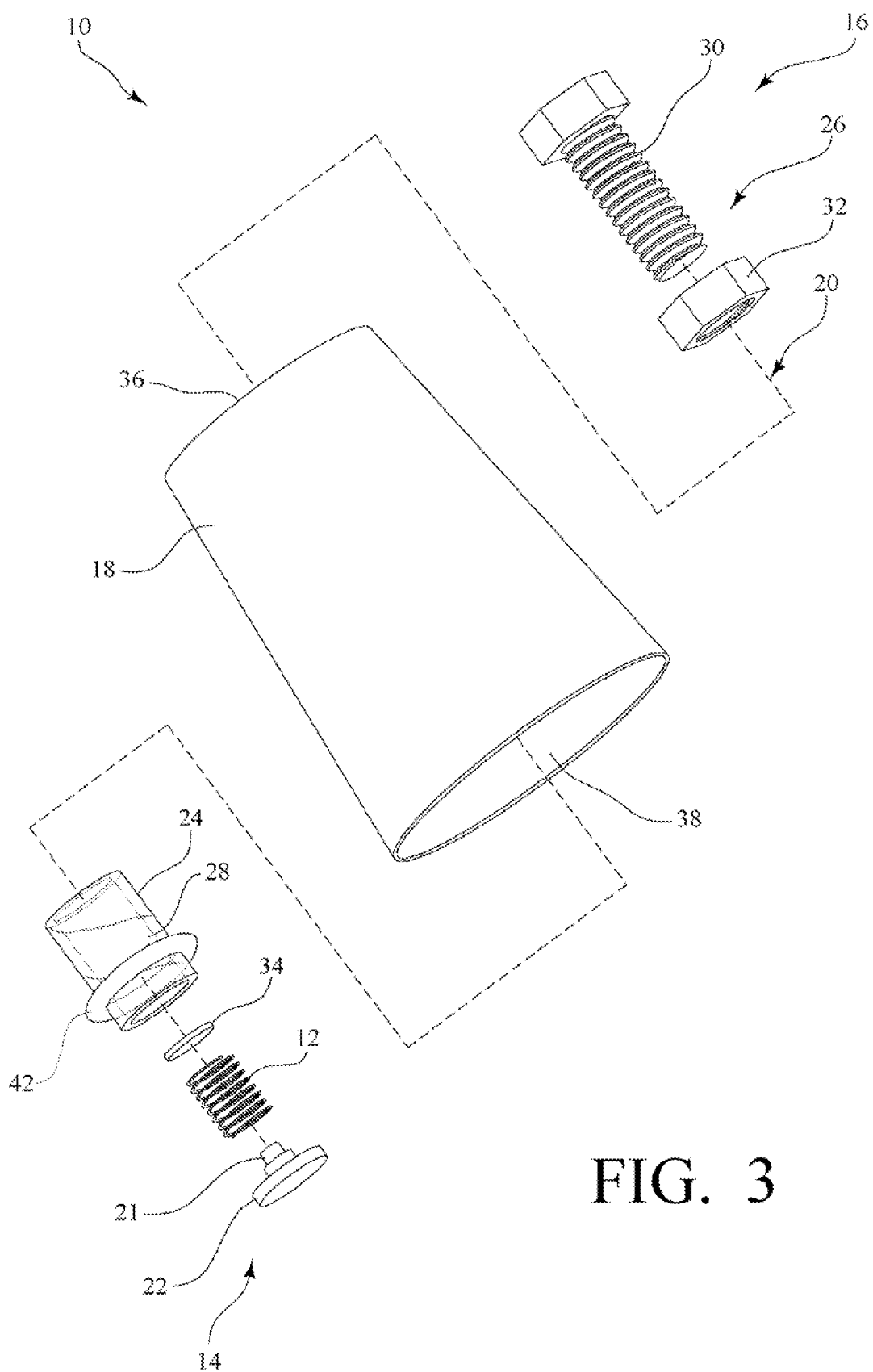
FIG. 3 is an exploded perspective view of a second exemplary embodiment of an LED lighting system according to the invention.

FIG. 3 shows a second exemplary embodiment 40 similar to the system previously described, but further having a small light-transmitting element 42, such as translucent tape, a second fiber, or a light-transmitting toroidal shaped element (as shown), doped with a different wavelength converting material positioned around an outer portion of the light-transmitting tube 28. In use, the light-transmitting element 42 adds another degree of adjustment of the color of the mixed light directed out of the open end 38 of the light-collecting and mixing element 18.

C. Third Exemplary Embodiment

Figure 4:
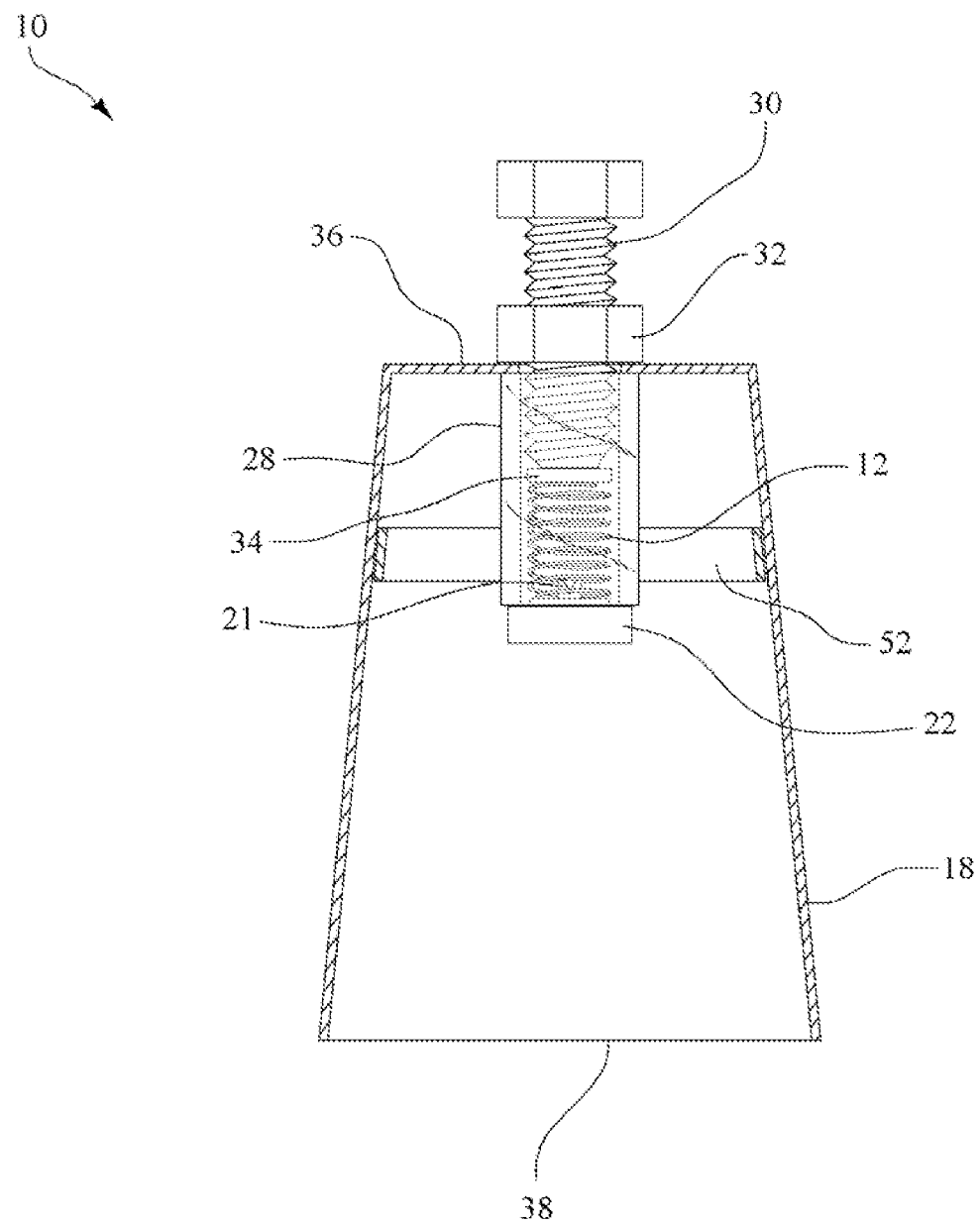
FIG. 4 is a side view of a third exemplary embodiment of an LED lighting system according to the invention, with a portion of a light-collecting and mixing element cut away.

Light-Reflecting Element Around Interior Surface of Light-Collecting and Mixing Element Similarly, FIG. 4 shows a third exemplary embodiment 50 similar to the system described in conjunction with FIG. 1 and FIG. 2, but further having a light-reflecting element 52, such as a ring of reflective tape, a coating of paint, or the like, containing a different wavelength converting material positioned around a portion of the interior surface of the light-collecting and mixing element 18. In use, the light-reflecting element 52 also adds another degree of adjustment of the color of the mixed light directed out of the open end 38 of the light-collecting and mixing element 18.

D. Fourth Exemplary Embodiment

Double Filament

Figure 5:
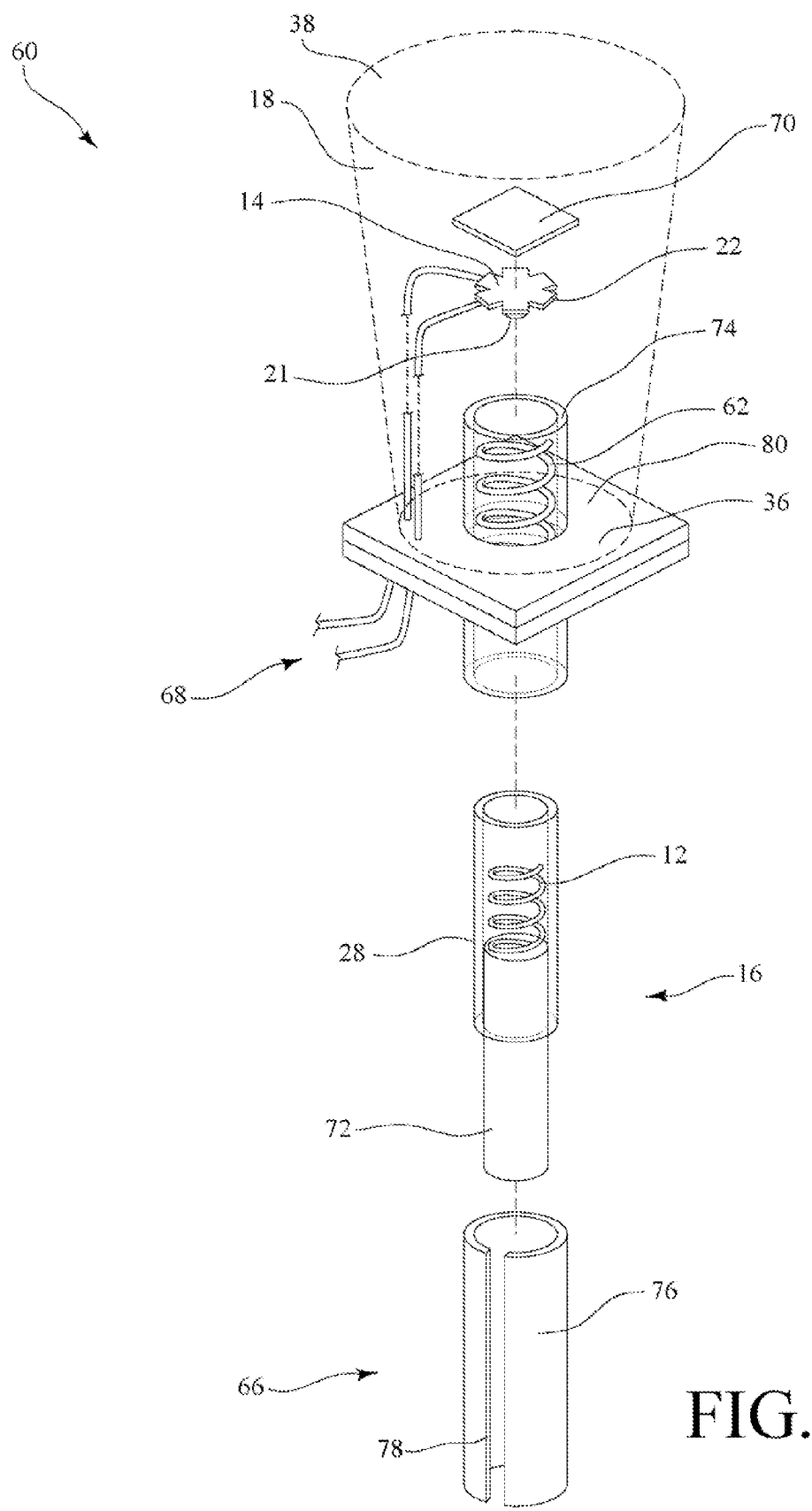
FIG. 5 is an exploded perspective view of a fourth exemplary embodiment of an LED lighting system according to the invention.

FIG. 5 shows still another exemplary embodiment 60 of an LED lighting system. As shown, similar to system described in conjunction with FIG. 1 and FIG. 2, the exemplary LED lighting system has a first helical fiber 12, an LED 14, a means 16 of adjusting the compression of the first helical fiber 12, and a light-collecting and mixing element 18. However, the exemplary embodiment of FIG. 5 also has a second helical fiber 62, and a means 66 of adjusting the compression of the second helical fiber 62.

The first helical fiber 12 and the second helical fiber 62 are both light-transmitting fibers formed in the shape of a cylindrical coil, spiral or helix. However, the second helical fiber 62 has a diameter that is larger than the diameter of the first helical fiber 12. The second helical fiber 62 is positioned around and is aligned coaxially with the first helical fiber 12. The first helical fiber 12 is doped with a first wavelength converting material, and the second helical fiber 62 is doped with a second wavelength converting material.

The LED 14 is also a side-emitting LED having a light-emitting portion 21 and a base portion 22. The LED 14 is positioned such that its light-emitting portion 21 is within the cylindrical interior space defined by the first helical fiber 12. Since the second helical fiber 62 is positioned around the first helical fiber 12, the LED 14 is, therefore, also positioned within the cylindrical interior space defined by the second helical fiber 62. Also shown are electrical leads 68 for supplying power to the LED 14, and a backing plate 70 that acts as a heat sink for dissipating heat from the LED 14.

The means 16 of adjusting the compression of the first helical fiber 12 includes a first light-transmitting tube 28 and a cylindrical plunger 72. The inner diameter of the first light-transmitting tube 28 is larger than the diameter of the first helical fiber 12, and the outer diameter of the first light-transmitting tube 28 is smaller than the diameter of the second helical fiber 62. The first light-transmitting tube 28 is positioned between the first helical fiber 12 and the second helical fiber 62. The diameter of the cylindrical plunger 72 is slightly smaller than the inner diameter of the first light-transmitting tube 28. The cylindrical plunger 72 is slidingly received within the first light-transmitting tube 28 with one end of the cylindrical plunger 72 adjacent one end of the first helical fiber 12. The first helical fiber 12 is positioned in the interior of the first light-transmitting tube 28 around the LED light-emitting portion 21 and between the LED base portion 22 and the cylindrical plunger 72.

The means 66 of adjusting the compression of the second helical fiber 62 includes a second light-transmitting tube 74 and a tubular plunger 76. The inner diameter of the second light-transmitting tube 74 is slightly larger than the diameter of the second helical fiber 62. The second light-transmitting tube 74 is positioned around second helical fiber 62. The diameter of the tubular plunger 76 is substantially the same as the diameter of the second helical fiber 62. The tubular plunger 76 is slidingly received between the second light-transmitting tube 74 and the first light-transmitting tube 28 with one end of the tubular plunger 76 adjacent one end of the second helical fiber 62. The second helical fiber 62 is positioned between the first light-transmitting tube 28 and the second light-transmitting tube 74 around the LED light emitting portion 21 and between the LED base portion 22 and the tubular plunger 76.

The light-collecting and mixing element 18 is cup-shaped and receives at least the LED light emitting portion 21, the first helical fiber 12, and the second helical fiber 62 in its cup-shaped cavity. The light-collecting and mixing element 18 is for collecting and mixing light from the LED light-emitting portion 21, the first helical fiber 12 and the second helical fiber 62. The light-collecting and mixing element 18 has a closed end 36 and an open end 38. The closed end may be formed from a reflecting plate 80 having a reflective interior surface. The closed end 36 may further have an opening sized for allowing the second light-transmitting tube 74 to protrude through the closed end 36 and into the interior of the light-collecting and mixing element 18 and for holding the second light-transmitting tube 74 in a fixed position.

Preferably, the tubular plunger 76 also has a longitudinal slot 78, for allowing support structure (not shown) to extend between the second light-transmitting tube 74 and the first light-transmitting tube 28, in order to hold the first light-transmitting tube 28 in a fixed position.

In operation, the LED light-emitting portion 21 emits light of a first wavelength or color. A portion of the emitted light passes through the open spaces between the turns of the first helical fiber 12 and the second helical fiber 62. A portion of the emitted light is received by the first helical fiber 12 and converted to a light of a second wavelength or color. A portion of the emitted light is received by the second helical fiber 62 and converted to a light of a third wavelength or color. Further, a portion of the light of a second wavelength may also be received by the second helical fiber 62 and converted to a light of a third wavelength. The light-collecting and mixing element 18 collects and mixes the light of a first color, the light of a second color, and the light of a third color, and directs the mixed light out the open end 38 of the light-collecting and mixing element 18.

Advantageously, the cylindrical plunger 72 and the tubular plunger 76 allow the open spaces between the turns of the first helical fiber 12 and the second helical fiber 62, respectively, to be adjusted by compressing or decompressing the first helical fiber 12 and the second helical fiber 62, thereby changing the percentages of the light of the first color, the light of the second color, and the light of the third color that are present in the mixed light, and the perceived color of the mixed light.

E. Fifth Exemplary Embodiment

Figure 6:
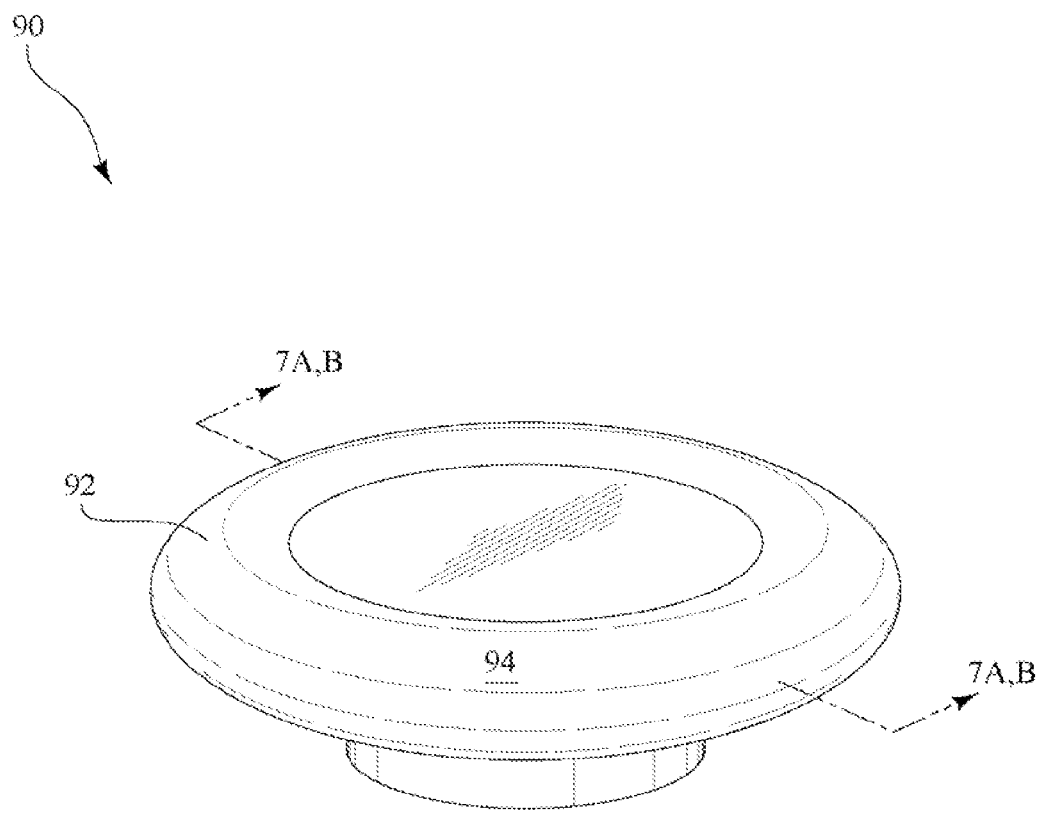
FIG. 6 is a perspective view of a fifth exemplary embodiment of a LED lighting system according to the invention.

Illumination Device for Simulating Neon or Similar Lighting in the Shape of a Toroid FIG. 6 is a perspective view of a fifth exemplary embodiment 90 of an LED lighting system with a helical fiber filament. The fifth exemplary embodiment 90 is an illumination device for simulating neon or similar lighting in the shape of a toroid, such as described in co-pending and commonly assigned application Ser. No. 11/421,502, the entire disclosure of which is incorporated herein by reference.

The fifth exemplary embodiment 90 has a light-transmitting member 92 formed of a light-transmitting medium in the shape of a toroid. The light-transmitting member 92 has a light-emitting surface 94. In use, the light-transmitting member 92 emits light has a substantially uniform intensity or brightness along the light-emitting surface 94, simulating neon or similar lighting in the shape of a toroid.

Figure 7A:
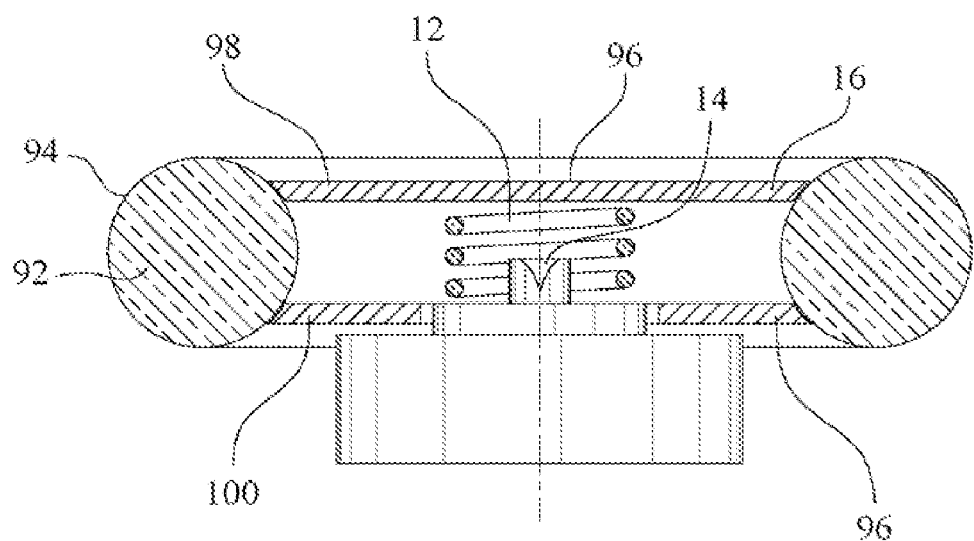
FIG. 7A and FIG. 7B are side sectional views of the LED lighting system of FIG. 6.

FIG. 7A is a side sectional view of the fifth exemplary embodiment 90 of FIG. 6. As shown, the exemplary embodiment 90 has the toroidal light-transmitting member 92, a helical fiber 12, an LED 14, a means 16 of adjusting the compression of the helical fiber 12, and a light-directing housing 96.

The light-transmitting member 92 is a "leaky" waveguide, having both optical waveguide and light scattering characteristics. As a result, the light-transmitting member 92 emits light along the light-emitting surface 94 with a uniformity and brightness that is characteristic of neon or similar lighting.

The LED 16 is located along the central axis of the toroidal light-transmitting member 92.

The helical fiber 12 is positioned coaxial with the light-transmitting member 92 and the LED 16.

The light-directing housing 96 in the illustrated embodiment has a top reflector member 98 and a bottom reflector member 100 for directing light from the LED 14 to the light-transmitting member 92. The top reflector member 98 is disk-shaped and covers a top portion of the opening defined by the toroidal light-transmitting member 92. The bottom reflector member 100 is ring-shaped and covers the bottom portion of the opening defined by the toroidal light-transmitting member 92. The LED 14 is received in the opening defined by the ring-shaped bottom reflector member 100. Thus, the light-directing housing 96 guides light from the LED 14 into the light-transmitting member 92, such that light is emitted only through the light-transmitting member 92.

Figure 7B:
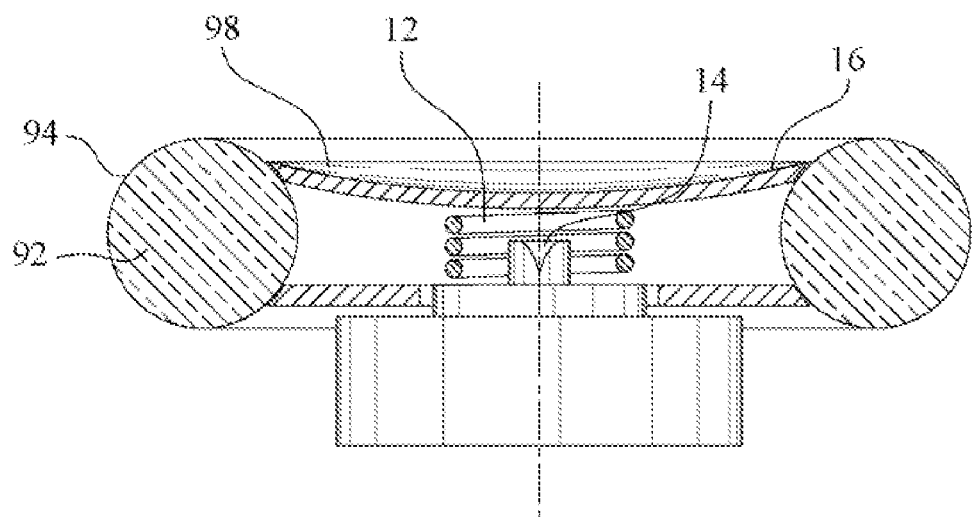

As shown in FIG. 7B, the top reflector member 98 is flexible, allowing it to also serve as the means 16 of adjusting the compression of the helical fiber 12. By adjusting the compressing of the helical fiber 12, the mixture of the light from the LED 14 and the light from the helical fiber 12 reaching the light-transmitting member 92 are adjusted, changing the perceived color of light emitted through the light-transmitting member 92.

F. Sixth Exemplary Embodiment

Light-Transmitting Rod

Figure 8:
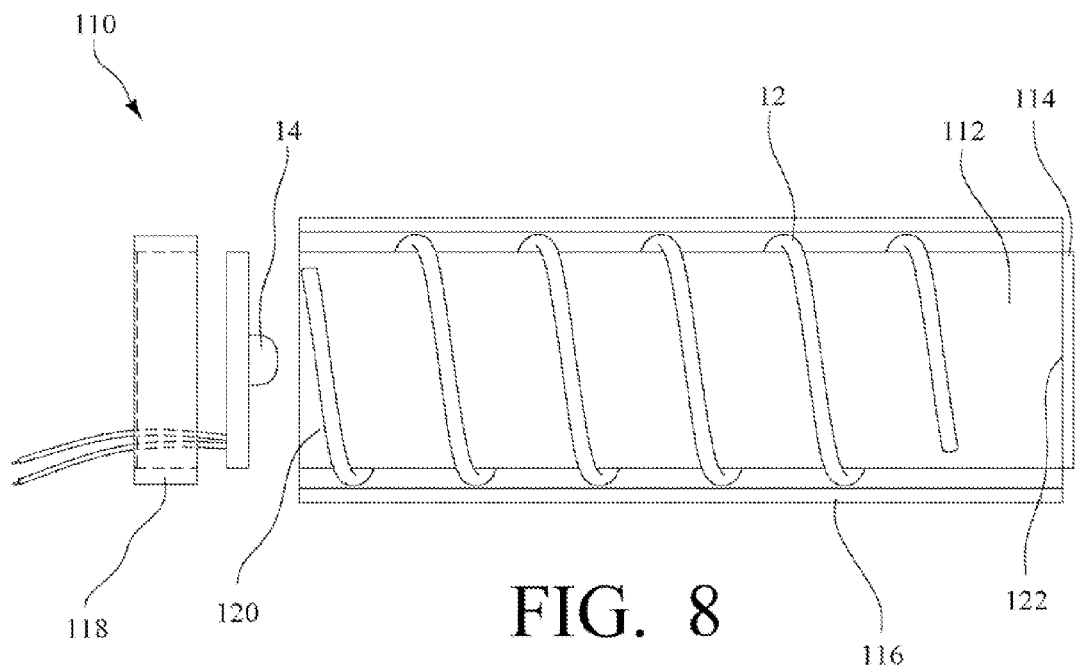
FIG. 8 is an exploded side view of a sixth exemplary embodiment of a LED lighting system according to the invention.

FIG. 8 shows a sixth exemplary embodiment 110 of an LED lighting system having: a helical fiber 12, a LED 14, a light-transmitting rod 112, a reflector 114, a substantially clear outer sheath 116, and a reflective ring/LED holder/heat sink 118. The LED 14 is positioned in the reflective ring/LED holder/heat sink 118 to emit light into a proximal end 120 of the rod 112. Preferably, the LED 14 is a top emitting LED. The helical fiber 12 is positioned around the rod 112, surrounding at least a portion of the rod 112. The reflector 114 caps a distal end 122 of the rod 112 (opposite the LED 14). The substantially clear outer sheath 116 encases the rod 112 and the helical fiber 12.

Figure 9:
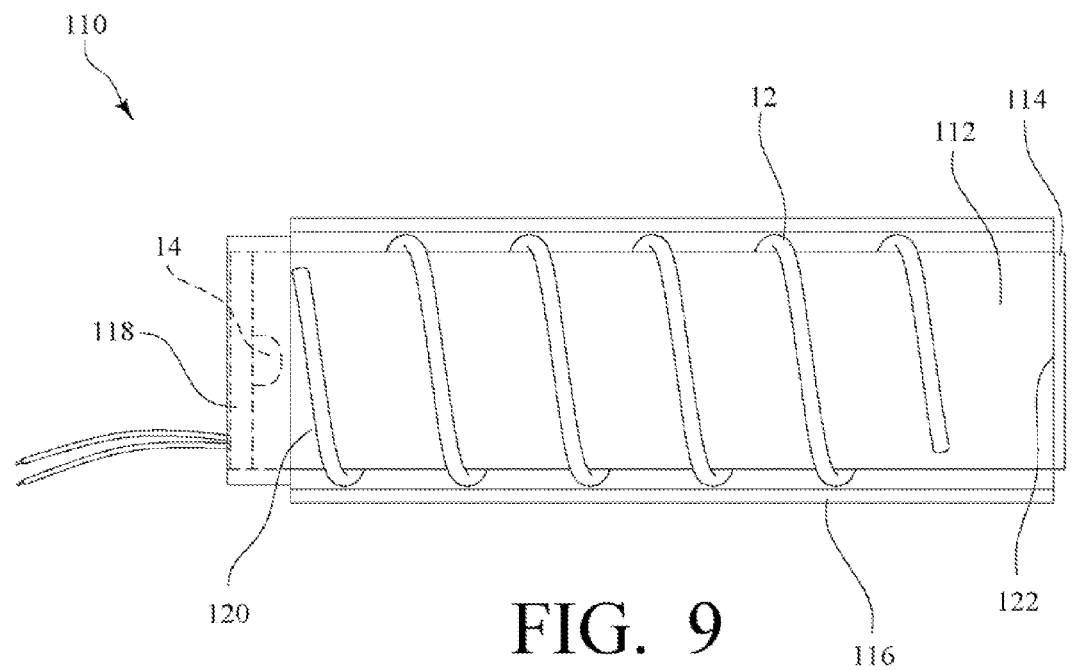
FIG. 9 is a non-exploded side view of the LED lighting system of FIG. 8.

FIG. 9 shows the assembled sixth exemplary embodiment 110 of the LED lighting system. Additionally, the light source could include potting compound (not shown) between the LED 14 and the light-transmitting rod 112. Further, the LED lighting system could include conductive grease (not shown) between the LED 14 and the reflective ring/LED holder/heat sink 118. Additionally, the proximal end 120 of the rod 112 may be smooth or roughed up (lambertian), or curved. The sheath 116 holds index matching fluid (not shown) for optically coupling the rod 112 to the helical fiber 12. Alternatively, if the rod 112 is made of a scattering material, such as DR acrylic, then the sheath 116 and index matching fluid is not needed for coupling the rod 112 to the helical fiber 12.

In operation, light is generally directed along the axis of the rod 112, which acts as a waveguide. Index matching fluid breaks the interface between the helical fiber 12 and the rod 112, and causes the helical fiber 12 to receive a portion of the light emitted from the rod 112. The wavelength converting material of the helical fiber 12 causes the light passing through the helical fiber 12 to have a color different than that of the LED 14. The reflector 114 also directs light into the helical fiber 12. Further, another reflector or mirror (not shown) could be positioned at the proximal end 120 of the rod 112 to direct light into the helical fiber 12. Thus, the helical fiber 12 acts as a "filament."

The color (or hue) of the emitted light is controlled depending on the following six variables: (a) the wavelength or color of the light emitted by the LED 14; (b) the density of the windings of the helical fiber 12; (c) the cross-sectional shape of the helical fiber 12; (d) the thickness of the helical fiber 12; (e) the color and density of the dyes in the helical fiber 12; and (f) the color and density of any dyes in the rod 112 or sheath 116. Although many of the variables must be pre-established, the density of the windings of the helical fiber 12 can be readily altered.

G. Seventh Exemplary Embodiment

Light-Transmitting Tube with Solenoid Adjustment

Figure 10A:
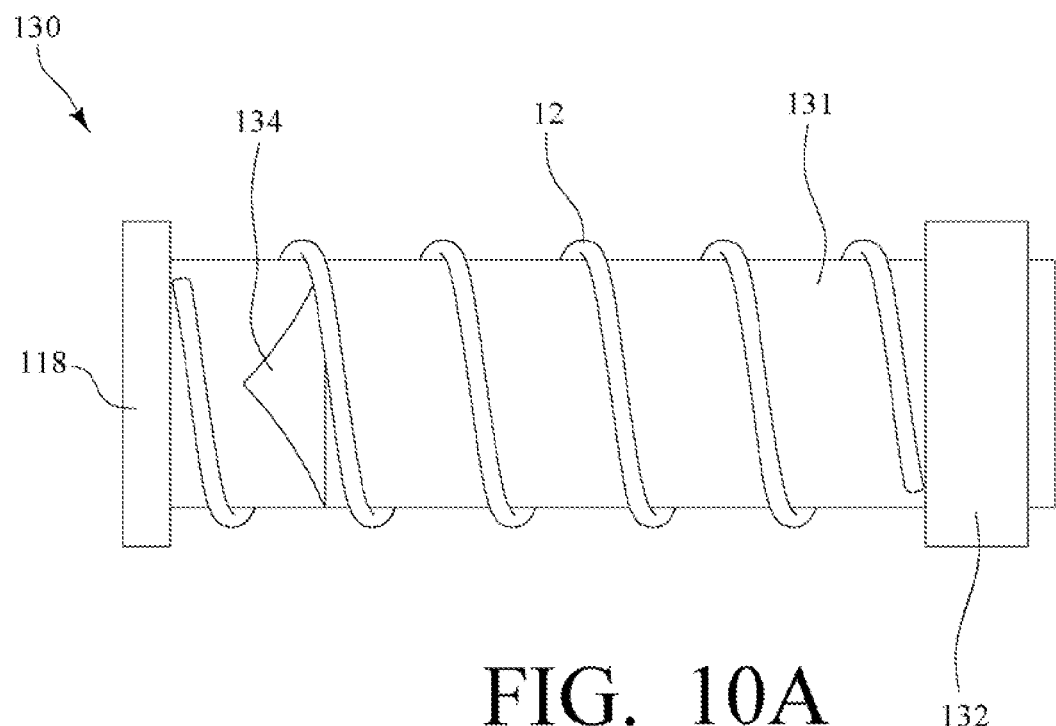
FIG. 10A and FIG. 10B are side views of a seventh exemplary embodiment of a LED lighting system according to the invention.
Figure 10B:
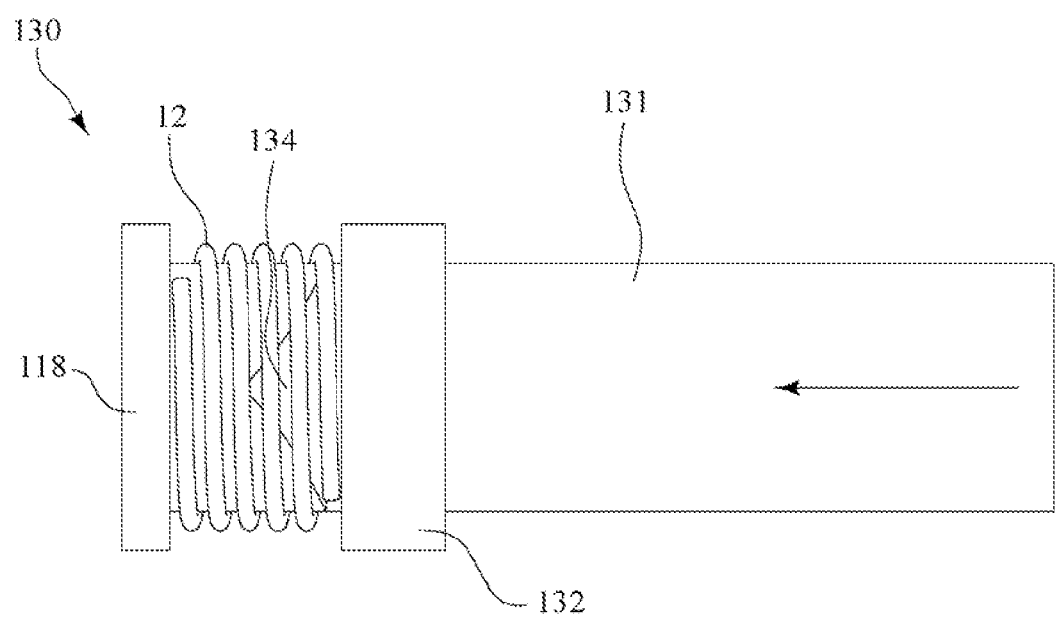

In a seventh exemplary embodiment 130 as shown in FIGS. 10A and 10B, a solenoid 132 could be used to compress the helical fiber 12. The seventh exemplary embodiment 130 has a light-transmitting tube 131 having a formed reflector 134 in the middle to direct light out the sides of the rod 112. It should be noted that means of compression, other than the solenoid 132, could be employed. Additionally, other reflector arrangements could be employed without departing from the teachings of the invention. For instance, the formed reflector 134 could be moved along the length of the rod 112 to achieve a desired effect.

By altering the density of the windings of the helical fiber 12 in this manner, the color (or hue) of the emitted light can be altered as desired. Significantly, the amount of unaltered light allowed to escape is much greater in FIG. 10A than it is in FIG. 10B. In FIG. 10B, the hue shifts away from the unaltered color of the light emitted from the LED 14 and toward the hue of the light emitted by the wavelength converting material of the helical fiber 12.

If phosphorescent dye is used, the helical fiber 12 will continue to emit light even after the LED 14 is turned off. This "after glow" can be projected if the LED light source is placed at the focal point of a reflector or collector system.

Additional advantages may be obtained by adding dye to the tube 131.

H. Eighth Exemplary Embodiment

Light-Transmitting Tube with Multiple Parallel Wound Helical Fibers

Figure 11A:
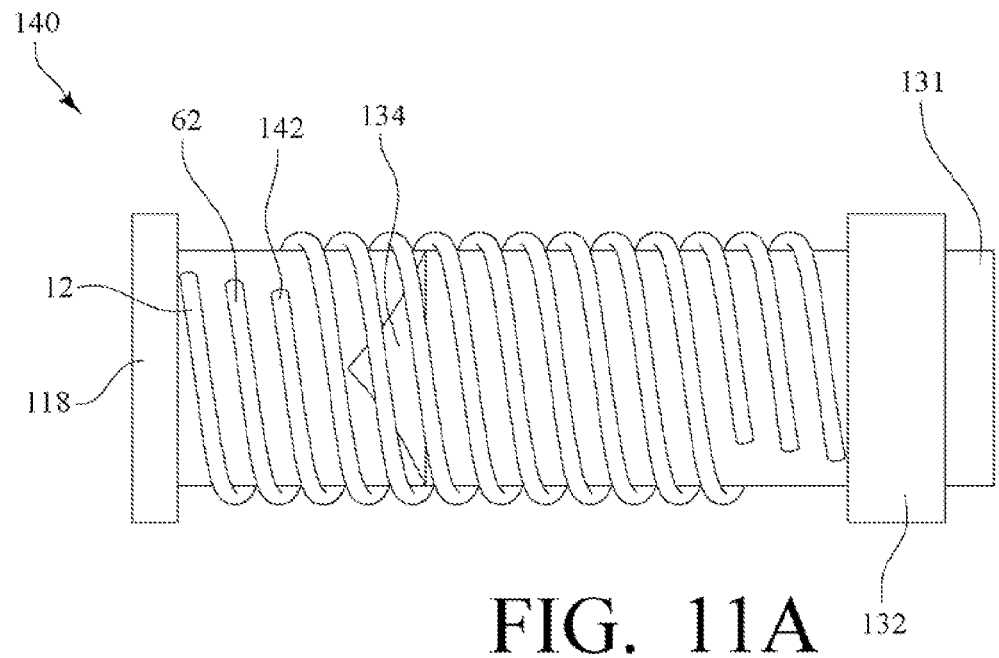
FIG. 11A and FIG. 11B are side views of an eighth exemplary embodiment of a LED lighting system according to the invention.
Figure 11B:
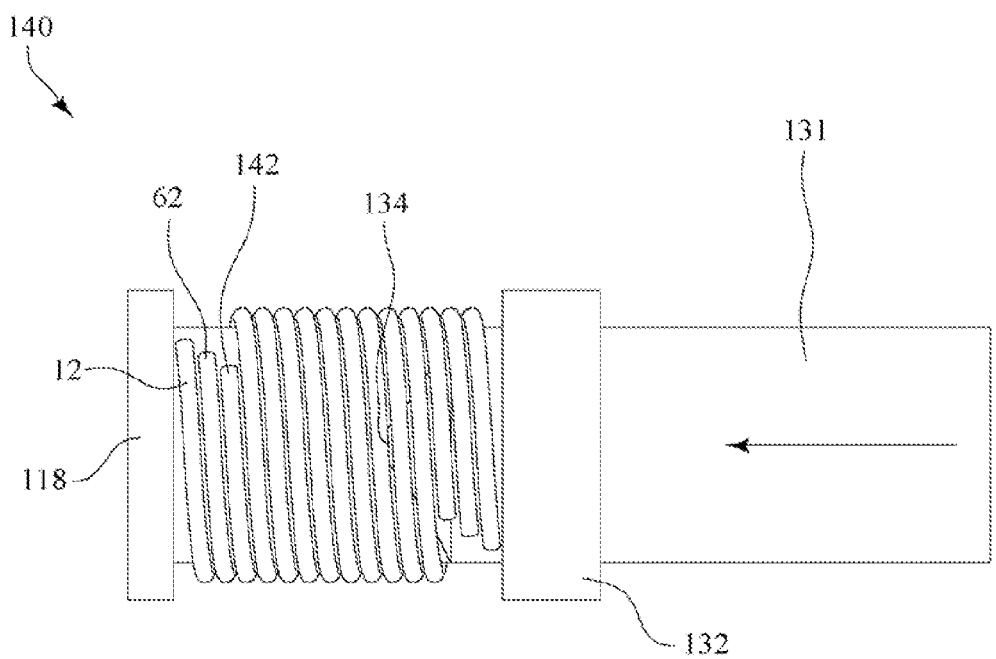

FIGS. 11A and 11B show an eighth exemplary embodiment 140 having multiple helical coils 12, 62, 142, each doped with a different wavelength converting material. The multiple helical coils 12, 62, 142 are wound in parallel.

I. Ninth Exemplary Embodiment

Figure 12A:
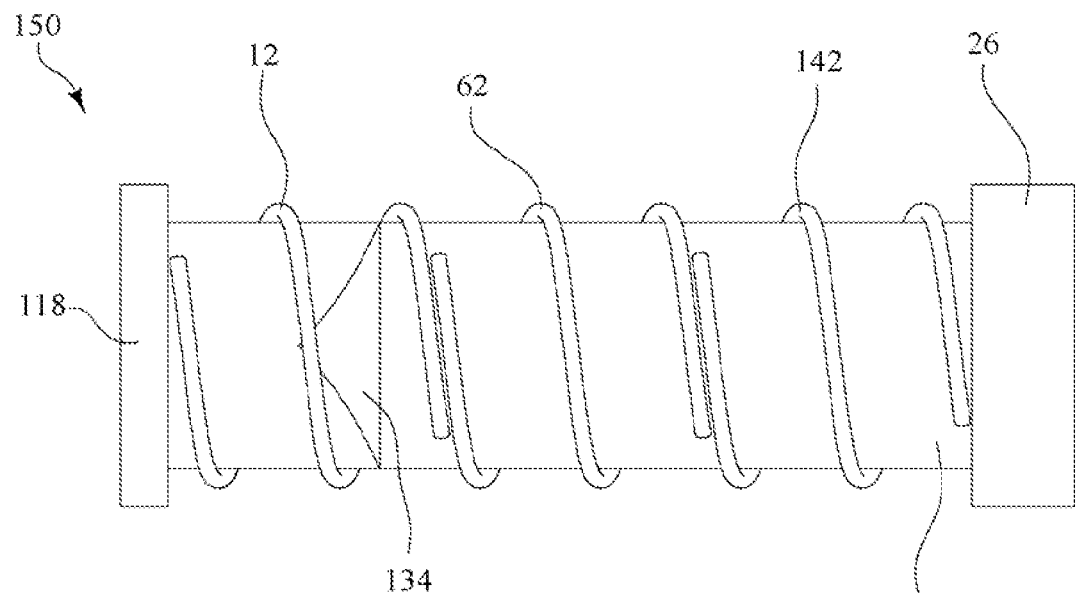
FIG. 12A and FIG. 12B are side views of a ninth exemplary embodiment of a LED lighting system according to the invention.
Figure 12B:
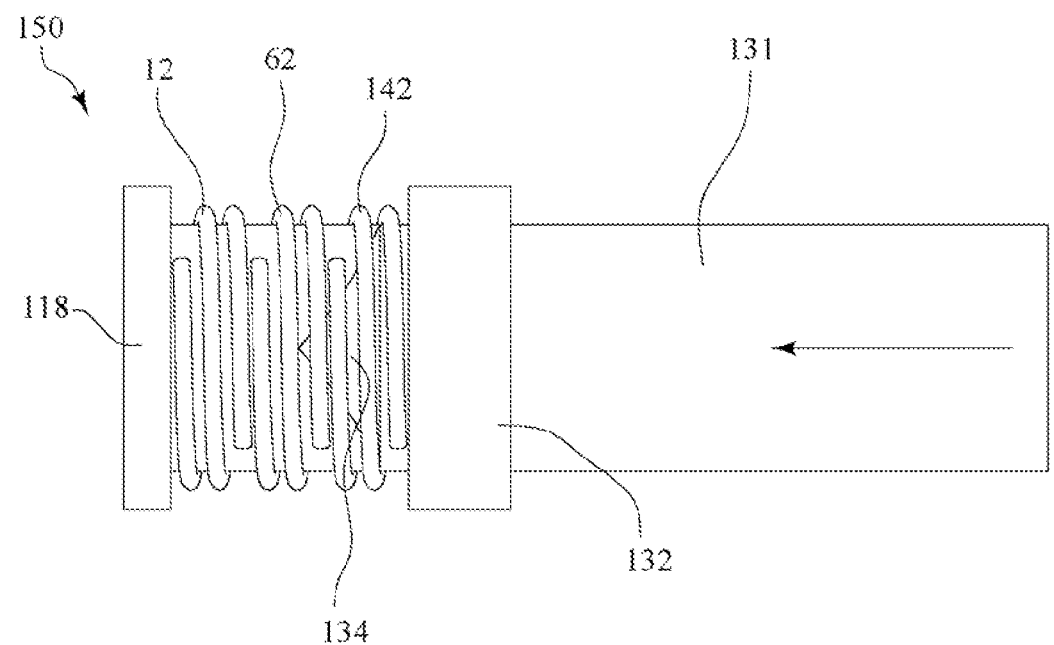

Light-Transmitting Tube with Multiple Helical Fibers Wound in Separate Sections FIGS. 12A and 12B show a ninth exemplary embodiment 150 having multiple helical coils 12, 62, 142, each doped with a different wavelength converting material. The multiple helical coils 12, 62, 142 are wound in separate sections.

J. Tenth Exemplary Embodiment

Bulb-Shaped Rod

Figure 13:
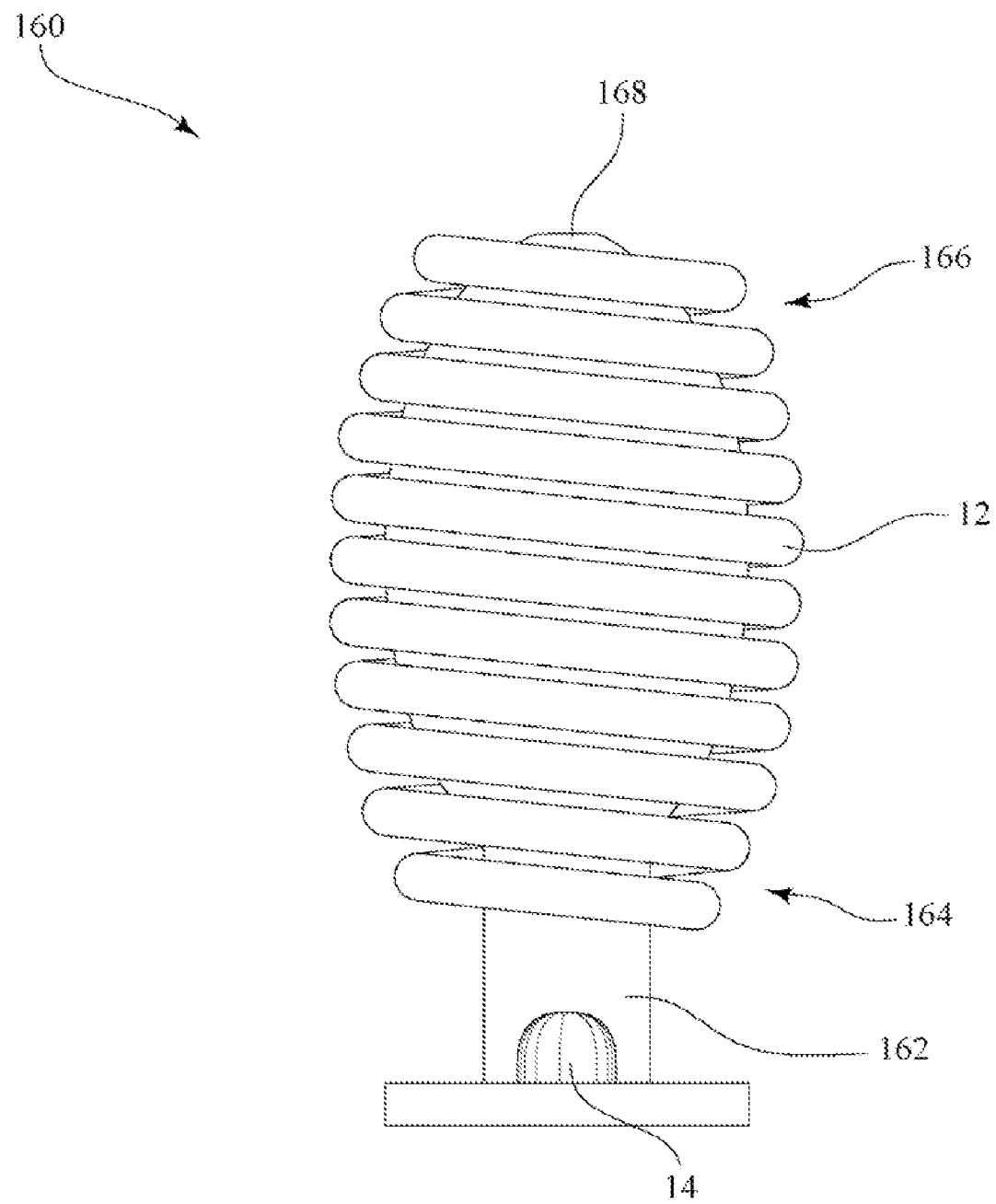
FIG. 13 is a side view of a tenth exemplary embodiment of a LED lighting system according to the invention.

FIG. 13 shows a tenth exemplary embodiment 160 of a LED lighting system. The tenth embodiment 160 has a bulb-shaped rod 162 having a proximal end 164 and a distal end 166, and a reflector 168 positioned at the distal end 166. An LED (not shown) can be positioned to emit light into the proximal end 164 of the bulb-shaped rod 162. In one variation, the bulb 36 is doped with a dye. A helical fiber 12 is positioned around the bulb-shaped rod 162. The helical fiber 12 is doped with a wavelength converting material.

K. Eleventh Exemplary Embodiment

Dome-Shaped Spiral Fiber

Figure 14:
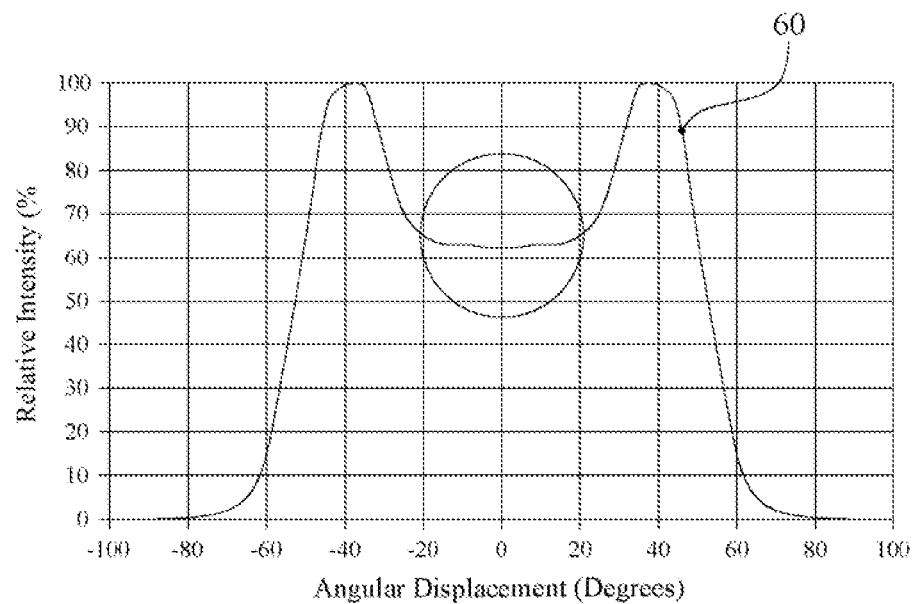
FIG. 14 is a graph of a radiation pattern produced by an exemplary LED.

Selection of dye migration resistant geometry and materials will provide LED lighting systems having reduced or eliminated dye migration. One aspect of the dye migration resistant geometry is selection of an LED that has a substantially uniform portion across its radiation intensity pattern. For example, FIG. 14 shows a radiation pattern 170, called a batwing pattern, produced by LED model/part no. LXHL-MB1C available from Lumileds Lighting, U.S. LLC. As shown, the radiation pattern 170 is fairly uniform in the central region, from about −20 to +20 degrees. However, radiation intensity gradients that could cause dye migration exist outside of the central region.

Figure 15:
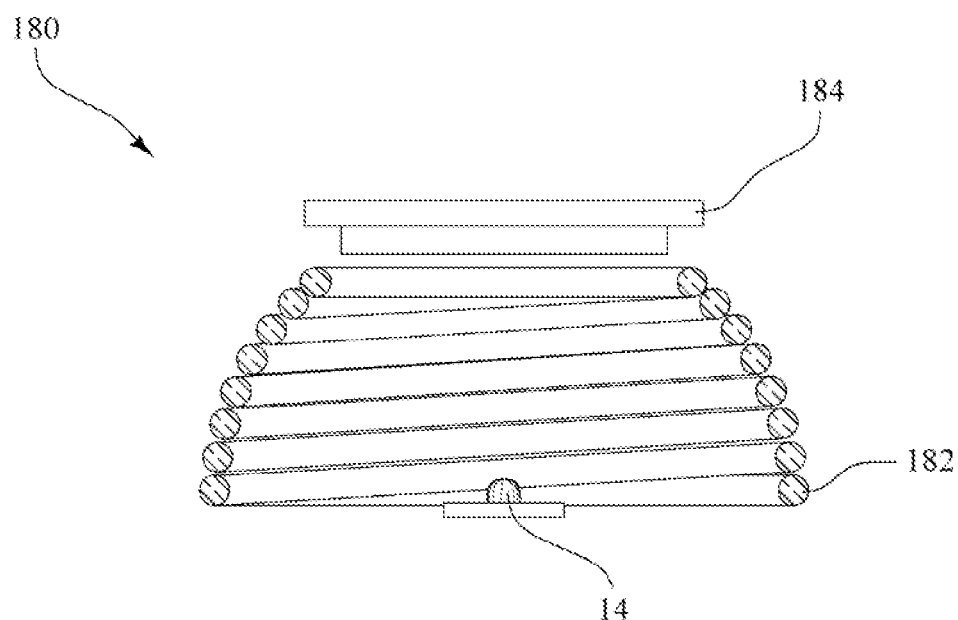
FIG. 15 is a side sectional view of an eleventh exemplary embodiment of an LED lighting system according to the invention.

FIG. 15 shows an eleventh exemplary embodiment of an LED lighting system having an LED 14, a dome-shaped helical fiber 182, and an end cap 184. More specifically, in this embodiment, the LED 14 is selected to have a substantially uniform radiation intensity pattern in a central region extending about 20 degrees around the radiation axis of the LED 14, such as the Lumiled LED described above. The end cap 184 is spaced from the LED 14 and positioned such that its edges intersect the uniform radiation intensity pattern of the LED 14, corresponding to the flat region shown in the batwing distribution. The end cap 184 can be either a transparent or translucent material doped with a dye. Since the radiation intensity pattern is substantially uniform across the end cap 184, migration of any dye is minimized. The end cap 184 can also be a reflective material. The dome-shaped helical fiber 182 is centered on the radiation axis of the LED 14 between the LED 14 and the end cap 184. The diameter of the fiber is selected such that there is there is less than a 10% change in relative intensity at any point in the helical fiber 182.

K. Twelfth Exemplary Embodiment

Helical Fiber Encased in Light-Transmitting Rod

Figure 16:
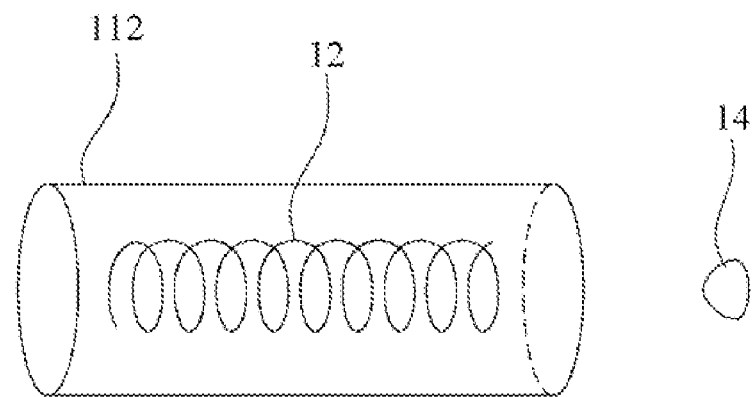
FIG. 16 is a side view of an twelfth exemplary embodiment of an LED lighting system according to the invention.
Figure 17:
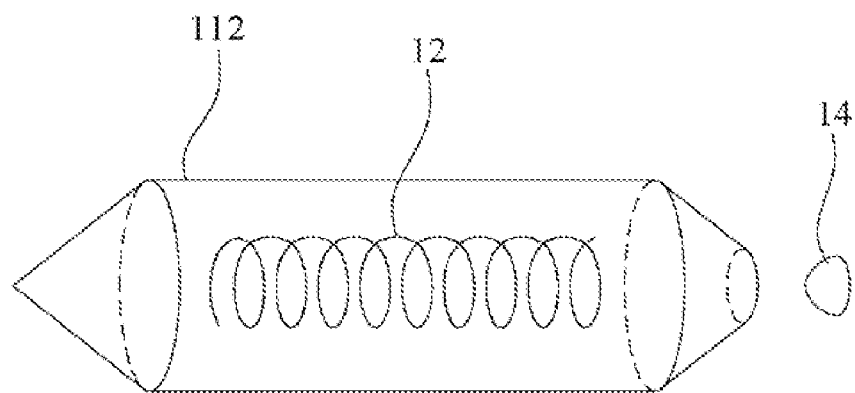
FIG. 17 is a side view of a variation of the exemplary embodiment of an LED lighting system of FIG. 16.

FIG. 16 and FIG. 17 show a twelfth exemplary embodiment of the invention, having an LED 14, a helical fiber 12, and a light-transmitting rod 112. The helical fiber 12 is encased in the light-transmitting rod 112. Light emitted by the LED 14 is confined by the light-transmitting rod 112 and will be symmetrically distributed perpendicular to the axis. The light-transmitting rod 112 can be clear or scattering. With respect to FIG. 17, the distal end of the light-transmitting rod is painted or taped to reflect the light.

L. Thirteenth Exemplary Embodiment

Helical Fiber with Tubular Fluorescent Lamp

FIG. 18 shows a thirteenth exemplary embodiment of the invention, having a tubular lamp 1800, a helical fiber 1802, and a compression means 1804.

The tubular lamp 1800, which may be a linear fluorescent lamp or the like, operably cooperates with a first lamp holder 1806 and a second lamp holder 1808 in a manner that is well known in the art. The tubular lamp 1800 emits light. The emitted light may be white light emitted across a spectrum of colors, or may be an ultraviolet light.

The helical fiber 1802 of the thirteenth exemplary embodiment is a light-transmitting fiber formed in the shape of a cylindrical coil, spiral or helix and is positioned around the tubular lamp 1800. The helical fiber 1802 is doped with a wavelength converting material, such as a fluorescent or phosphorescent dye or pigment, to convert received light to a light of a predetermined color. A helical axis of the helical fiber 1802 defines a central axis 1810. The helical fiber 1802 and the tubular lamp 1800 are axially aligned. The helical fiber 1802 may be made of either a clear or a frosted light-transmitting material, such as acrylic or the like. The helical fiber 1802 has a fixed end 1812 that is attached to the first lamp holder 1806. The helical fiber 1802 also has a movable end 1814. A portion of the light emitted by the tubular lamp 1800 will pass through the open space between the turns of the helical fiber 1802 and a portion of the light emitted by the tubular lamp 1800 will be received by the helical fiber 1802 and converted to the light of the predetermined color.

The compression means 1804 adjusts the compression of the helical fiber 1802, and includes a base member 1816, a pair of telescoping arms 1818, 1820, and a ring member 1822. The ring member 1822 slides over the tubular lamp 1800 and is attached to the telescoping arms 1818, 1820 on one side, and to the helical fiber movable end 1814 on the other side. Thus, actuation of the telescoping arms 1818, 1820 will cause the ring member 1822 to either compress or decompress the helical fiber 1802.

The compression means 1804 allows the open space between the turns of the helical fiber 1802 to be adjusted by compressing or decompressing the helical fiber 1802, thereby changing the percentages of the light from the lamp 1800 and the light of a particular color that are emitted proximate to the portion of the tubular lamp 1800 where the helical fiber 1802 is present.

Figure 25A:
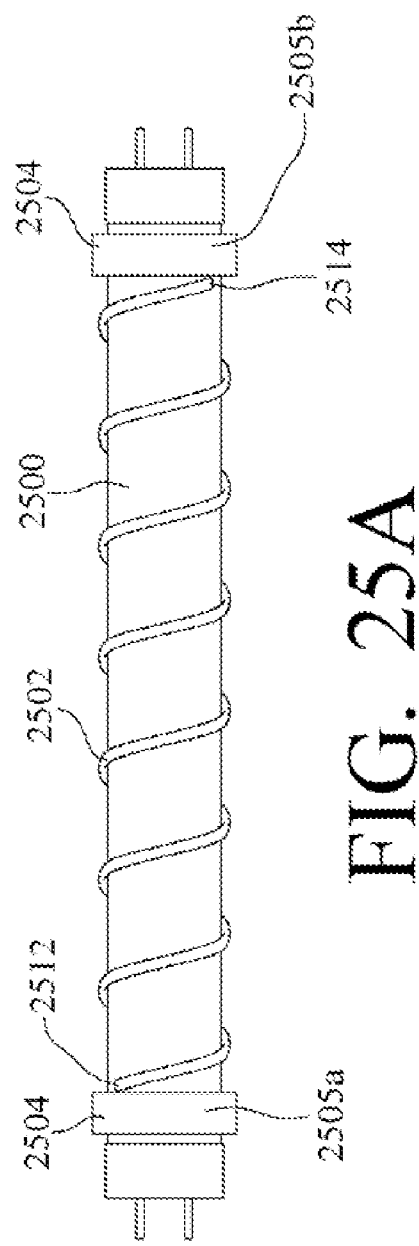
FIG. 25A and FIG. 25B are side views of an alternate embodiment of a tubular lamp and a helical fiber according to the invention.
Figure 25B:
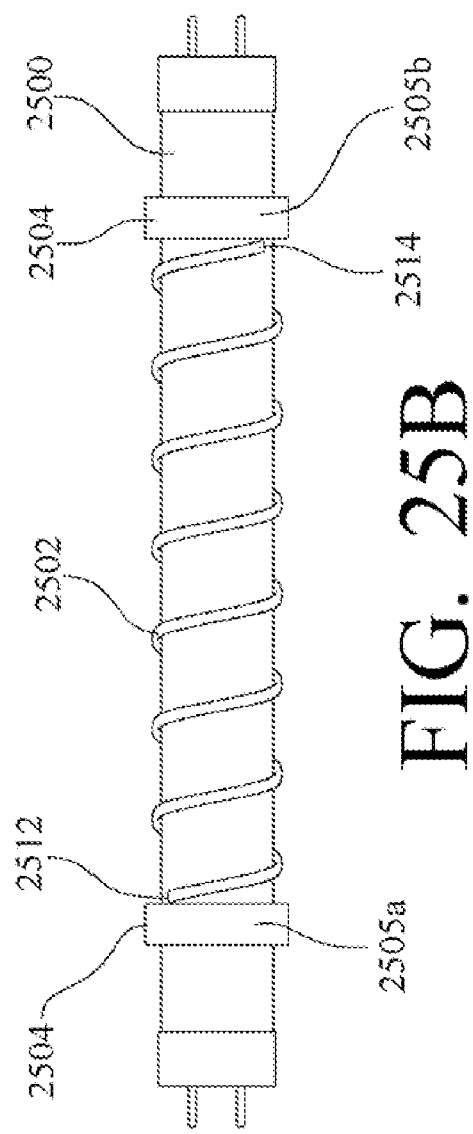

FIG. 25A and FIG. 25B show an alternate configuration of the thirteenth exemplary embodiment, having a tubular lamp 2500, a helical fiber 2502, and a compression means 2504. The compression means 2504 is a pair of simple compression clamps 2505a, 2505b.

Figure 26:
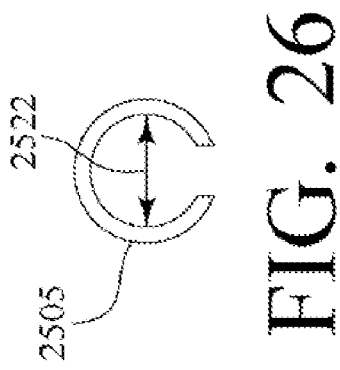
FIG. 26 is an end view of a compression clamp from FIG. 25A and FIG. 25B.

As shown in FIG. 26, the compression clamps 2505a, 2505b (shown generally as clamp 2505) have an inner diameter 2522 that is slightly smaller than the diameter of the tubular lamp 2500.

Returning to FIG. 25A and FIG. 25B, the helical fiber 2502 has a first end 2512 attached to a first compression clamp 2505a, and a second end 2514 attached to a second compression clamp 2505b. As shown in FIG. 25A, the compression clamps 2505a, 2505b can be positioned toward the ends of the lamp 2500 to stretch the helical fiber 2502. As shown in FIG. 25B, the clamps can be repositioned closer together to compress the helical fiber 2502 and increase the number of turns per unit length in the area of the lamp 2500 between the compression clamps 2505a, 2505b. Alternately, a loosely fitting helical fiber 2502 with a "memory" length extending the length of the lamp 2500 could be constrained or limited by the compression clamps 2505a, 2505b without being attached to the clamps 2505a, 2505b.

M. Fourteenth Exemplary Embodiment

Helical Fiber with Bulbous Lamp

FIG. 19 shows a fourteenth exemplary embodiment of the invention, having a bulbous lamp 1900, a helical fiber 1902, and a compression means 1904.

The bulbous lamp 1900 operably cooperates with a lamp holder 1906 in a manner that is well known in the art. The bulbous lamp 1900 may be an incandescent tungsten-filament lamp, a metal halide lamp, a high intensity discharge lamp, or the like.

The helical fiber 1902 of the fourteenth exemplary embodiment is a light-transmitting fiber formed in the shape of a conical coil, spiral or helix and is positioned around the bulbous lamp 1900. The helical fiber 1902 is doped with a wavelength converting material, such as a fluorescent or phosphorescent dye or pigment, to convert received light to a light of a predetermined color. A helical axis of the helical fiber 1902 defines a central axis 1910. The bulbous lamp 1900 and the helical fiber 1902 are substantially coaxially aligned. The helical fiber 1902 may be made of either a clear or a frosted light-transmitting material, such as acrylic or the like. The helical fiber 1902 has a fixed end 1912 and a movable end 1914. A portion of the light emitted by the bulbous lamp 1900 will pass through the open space between the turns of the helical fiber 1902 and a portion of the light emitted by the bulbous lamp 1900 will be received by the helical fiber 1902 and converted to the light of the predetermined color.

Other geometric shapes that may be used to shape the helical fiber 1902 include: cylindrical, conical, barrel-shaped, and hourglass shaped. Additionally, the helical fiber 1902 may include a cylindrical base portion around the base of the lamp 1900, and a conical top portion around the top of the lamp 1900. Still further, the helical fiber 1902 may include turns having a variable pitch.

The compression means 1904 adjusts the compression of the helical fiber 1902, and includes a base member 1916, a pair of telescoping arms 1918, 1920, and a beam member 1922. The base member 1916 is attached to the helical fiber fixed end 1912. The beam member 1922 is clear and extends between the telescoping arms 1914, 1916. The telescoping arms 1914, 1916 have a reflective surface. The beam member 1922 is attached to the helical fiber movable end 1914. Thus, actuation of the telescoping arms 1918, 1920 will cause the beam member 1922 to either compress or decompress the helical fiber 1902.

The compression means 1904 allows the open space between the turns of the helical fiber 1902 to be adjusted by compressing or decompressing the helical fiber 1902, thereby changing the percentages of the white light and the light of a particular color that are emitted by the assembly of the bulbous tube 1900 and the helical fiber 1902.

It has been determined that the apex of conical helixes compress a lesser amount than the wider bottoms, because the tighter, smaller diameter coils toward the apex are stiffer than the larger diameter coils toward the base.

N. Fifteenth Exemplary Embodiment

Illuminated Button Bulb

Figure 20:
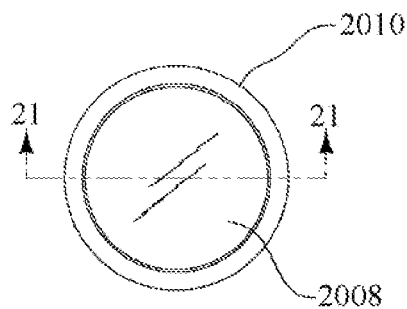
FIG. 20 is a top view of an illuminated button bulb according to the invention.
Figure 21:
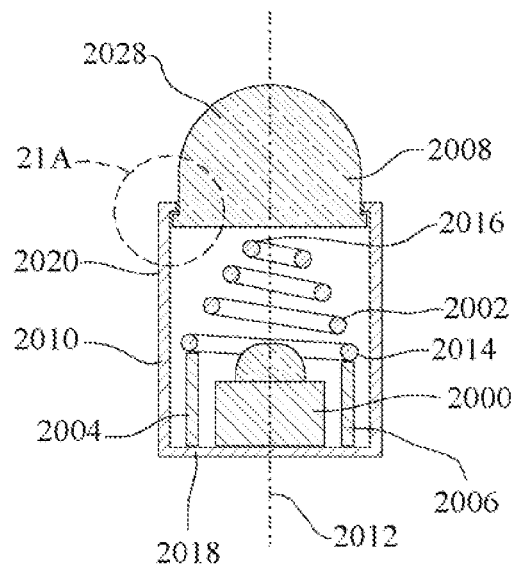
FIG. 21 is a side sectional view of the illuminated button bulb of FIG. 20 taken along section lines 21-21 of FIG. 20.
Figure 21A:
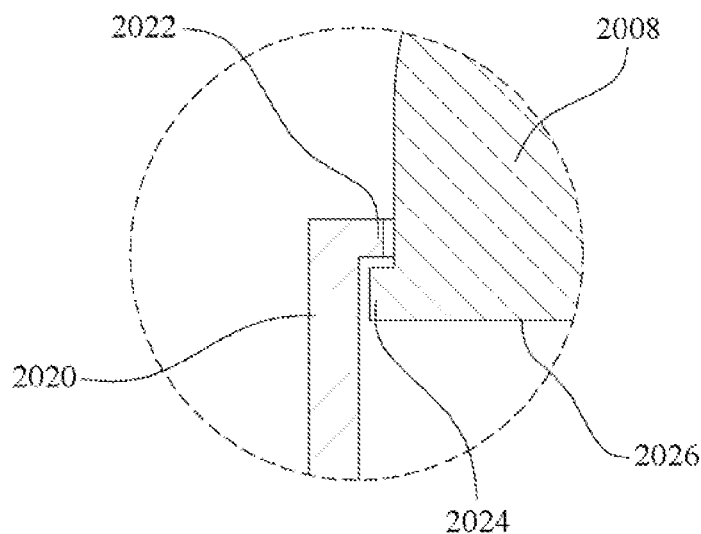
FIG. 21A is an enlarged portion of FIG. 21, as indicated by lines 21A-21A of FIG. 21.

FIG. 20 and FIG. 21 show a fifteenth exemplary embodiment of the invention which comprises an LED light source 2000, a helical fiber 2002, helical fiber support legs 2004, 2006, a button bulb element 2008, and a cylindrical housing 2010.

The helical fiber 2002 of the fifteenth exemplary embodiment is a is a light-transmitting fiber formed in the shape of a conical coil, spiral or helix and is positioned around the LED light source 2000. The helical fiber 2002 is doped with a wavelength converting material, such as a fluorescent or phosphorescent dye or pigment. A helical axis of the helical fiber 2002 defines a central axis 2012. The helical fiber 2002 may be made of either a clear or a frosted light-transmitting material, such as acrylic or the like. The helical fiber 2002 has a fixed end 2014 and a movable end 2016. A portion of the light emitted by the LED light source 2000 will pass through the open space between the turns of the helical fiber 2002 and a portion of the light emitted by the LED light source 2000 will be received by the helical fiber 2002. A portion of the light received by the helical fiber 2002 will be converted to a light of a particular color.

The LED light source 2000 of the fifteenth exemplary embodiment is a top-emitting LED. The LED light source 2000 is aligned coaxially with the helical axis of the helical fiber 2002 and the central axis 2012. The LED light source 2000 is positioned within the conical interior space defined by the helical fiber 2002.

The cylindrical housing 2010 has a bottom wall 2018 and a cylindrical side wall 2020 extending upwardly therefrom and defining a cavity and an open top. The LED light source 2000 is positioned in the cylindrical housing 2010 on the bottom wall 2018. The helical fiber support legs 2004, 2006 extend upwardly from the bottom wall 2018 and are attached to the helical fiber fixed end 2014, thereby supporting the helical fiber 2002 around the LED light source 2000. Alternately, in lieu of support legs 2004, 2006, a cylindrical support structure could be utilized to support the helical fiber 2002 in position around the LED light source 2000. The cylindrical side wall 2020 has an inwardly projecting lip 2022 positioned around its top edge. The interior surface of the cylindrical side wall 2020 has a light mixing and directing finish.

Figure 27:
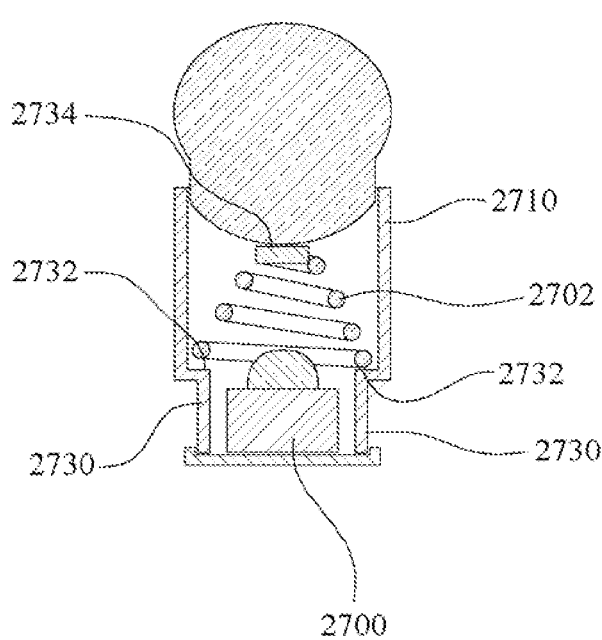
FIG. 27 is a side sectional view of an alternate embodiment of an illuminated button bulb according to the invention.

Further, in an alternate embodiment as shown in FIG. 27, a cylindrical housing 2710 is formed with a neck portion 2730 that has a smaller diameter than the diameter of the base of a conical helical fiber 2702, forming a horizontal step portion 2732 in the cylindrical housing for supporting the helical fiber 2702. Also shown in FIG. 27 is a light-transmitting disk member 2734 positioned at the apex of the conical helical fiber 2702 to intersect the brightest portion of beam of a LED light source 2700 having a lambertian beam pattern. The disk member 2734 is also doped with a wavelength converting material.

Returning now to FIG. 20 and FIG. 21, but with the understanding that the principles described herein are generally applicable to the alternate embodiment of FIG. 27, the button bulb element 2008 is made of a light-transmitting material, such as either a scattering or clear DR acrylic, that may or may not also be doped with a wavelength converting material. The button bulb element 2008 has an outwardly extending lip 2024 positioned around its base 2026. An upper portion 2028 extends upwardly from the base 2026 in the shape of a dome, although other shapes such as a cylinder are also contemplated within the scope of this embodiment. The button bulb element base portion 2026 is in contact with the helical fiber movable end 2016 and the button bulb element 2008 is biased upwardly by the helical fiber 2002. The button bulb element upper portion 2028 extends upward through the open top of the cylindrical housing. The button bulb element outwardly extending lip 2024 cooperates with the cylindrical housing inwardly extending lip 2022 to limit the upward travel of the button bulb element 2008. The cylindrical housing side wall 2020 cooperates with the button bulb element outwardly extending lip 2024 to guide the button bulb element downwardly when downward pressure is applied to the button bulb element 2008 with enough force to overcome the upward bias of the helical fiber 2002. Likewise, such downward movement will cause a compression of the helical fiber 2002.

In operation, the LED light source 2000 emits a light of a first wavelength or color. A portion of the emitted light passes through the open space between the turns of the helical fiber 2002, and a portion of the emitted light is received by the helical fiber 2002 and converted into light of a second wavelength or color. The cylindrical housing sidewall 2020 serves to mix the light of a first color and the light of a second color, and to direct the mixed light into the button bulb element 2008, such that the button bulb 2008 is illuminated by and emits the mixed light. When the button bulb element 2008 is depressed, the open space between the turns of the helical fiber 2002 will be reduced by compressing the helical fiber 2002, thereby changing the percentages of the light of the first color and the light of the second color that are directed into the button bulb element 2008. Thus, the color of the mixed light that illuminates and is emitted by the button bulb element 2008 is changed when the button bulb element 2008 is depressed. The color of the mixed light that illuminates and is emitted by the button bulb element 2008 will change back to the original color when the button bulb element 2008 is released and returns to its upward limit of travel.

O. Sixteenth Exemplary Embodiment

Illuminated Elongated Button Bulb

Figure 22:
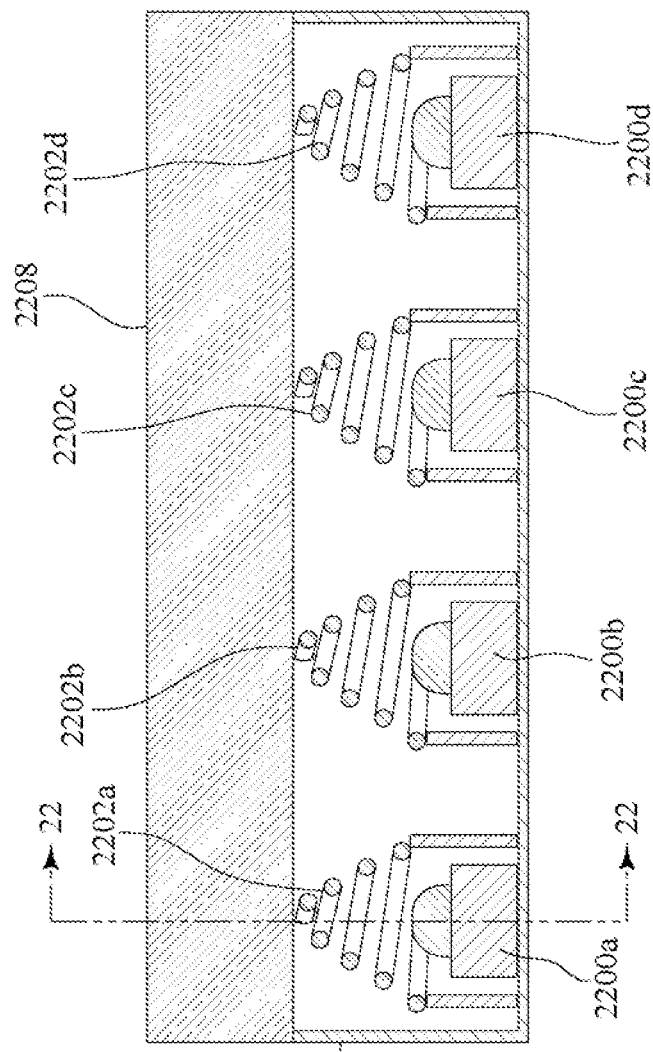
FIG. 22 is a sectional view of an illuminated elongated button bulb according to the invention, taken along section lines 22-22 of FIG. 23.
Figure 23:
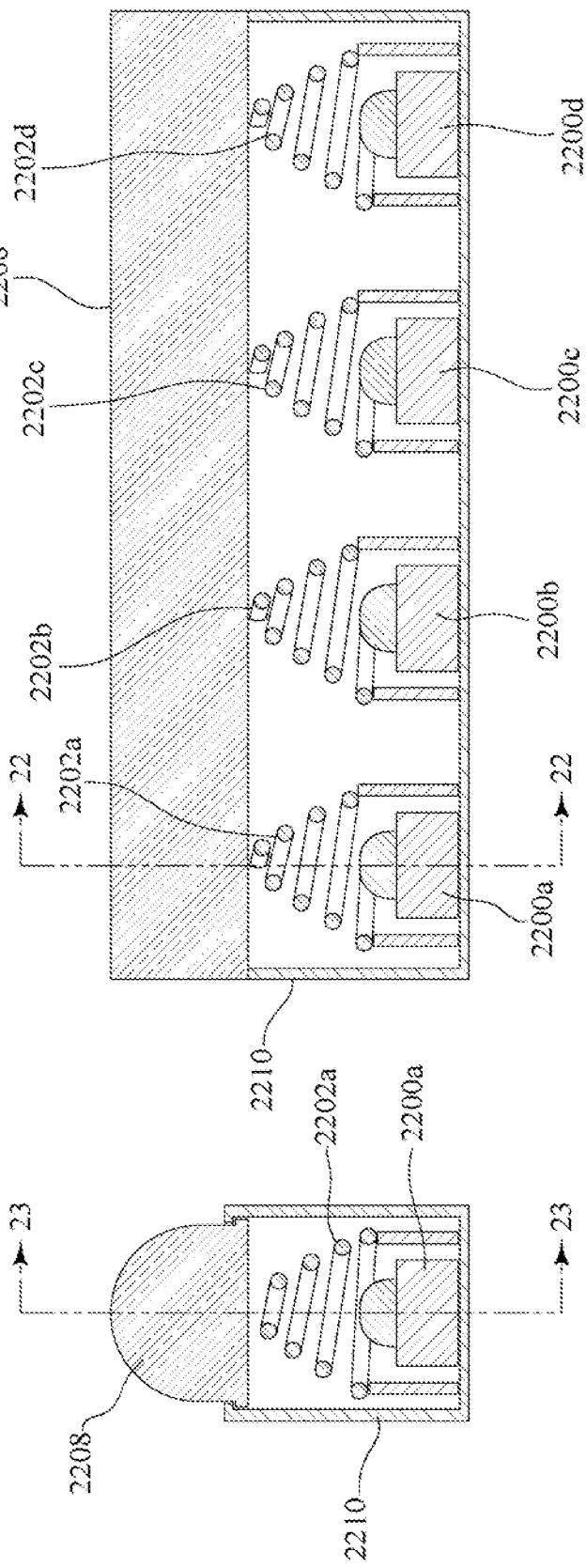
FIG. 23 is a sectional view of the illuminated elongated button bulb of FIG. 22, taken along section lines 23-23 of FIG. 22.
Figure 24:
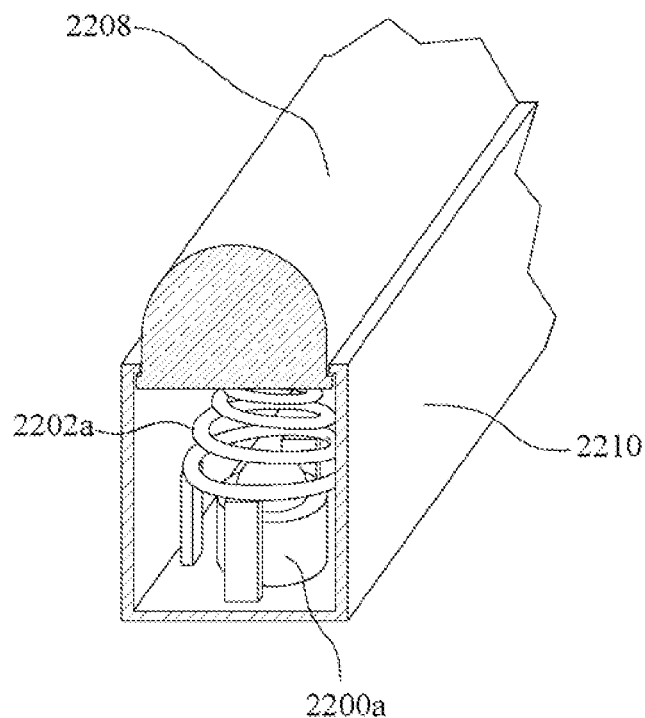
FIG. 24 is a partial perspective view of the illuminated elongated button bulb of FIG. 22 with an end of an elongated housing cut away.

FIG. 22, FIG. 23 and FIG. 24 show a sixteenth exemplary embodiment, which is a variation on the illuminated button bulb of FIG. 20 and FIG. 21. In the sixteenth exemplary embodiment, a plurality of LED light sources 2200a, 2200b, 2200c, 2200d are arranged linearly in an elongated housing 2210. A plurality of conical helical fibers 2202a, 2202b, 2202c, 2202d are respectively positioned around the plurality of LED light sources 2200a, 2200b, 2200c, 2200d. An elongated light-transmitting button bulb element 2208 is retained by the elongated housing 2210 and upwardly biased by the plurality of conical helical fibers 2202a, 2202b, 2202c, 2202d. The properties of the elements are substantially similar to the properties of the elements of FIGS. 20 and 21.

In operation, the LED light sources 2200a, 2200b, 2200c, 2200d emit light of a first wavelength or color. A portion of the emitted light passes through the open space between the turns of the respective helical fibers 2202a, 2202b, 2202c, 2202d, and a portion of the light is received by the respective helical fibers 2202a, 2202b, 2202c, 2202d and converted into light of a second wavelength or color. The side walls of the elongated housing 10 mix the light and direct the mixed light into the elongated light-transmitting button bulb element 2208, such that the button bulb element 2208 is illuminated by and emits the mixed light. When the button bulb element 2208 is depressed, the helical fibers 2202a, 2202b, 2202c, 2202d are compressed and the color of the mixed light is changed, as described above with respect to the fifteenth exemplary embodiment.

One of ordinary skill in the art will also recognize that additional embodiments are possible without departing from the teachings of the present invention or the scope of the claims which follow. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A lighting system comprising:
    a helical light-transmitting fiber formed in the shape of a helix, said helical fiber being doped with a wavelength converting material, said helical fiber defining a helical axis; and
    a light source aligned axially with said helical fiber, such that a portion of any light emitted by said light source will pass through the open space between the turns of said helical fiber and a portion of any light emitted by said light source will be received by said helical fiber and converted to a light of a predetermined color.

2. The lighting system of claim 1, further comprising a compression means for adjusting the compression of said helical fiber for adjusting the amount of open space between the turns of said helical fiber, thereby changing the percentages of the light of the light source and the light of the predetermined color that are emitted by the lighting system.

3. The lighting system of claim 2, wherein said helical fiber further defines a cylindrical interior space, wherein said light source is a tubular lamp, and wherein said tubular lamp is positioned within said helical fiber cylindrical interior space.

4. The lighting system of claim 2, wherein said helical fiber further defines a conical interior space, wherein said light source is a bulbous lamp, and wherein said bulbous lamp is positioned within said helical fiber conical interior space.

5. An illuminated button bulb comprising:
    a housing having a bottom wall and a side wall extending upwardly from said bottom wall, said bottom wall and said side wall defining a cavity and an open top;
    a light-transmitting button bulb element having a base portion and an upper portion, said base portion received in said housing cavity and retained by said housing side wall, said upper portion extending upward through said housing open top;

a light source positioned in said housing cavity; and a helical light-transmitting fiber positioned in said housing cavity and around said light source, said helical light-transmitting fiber being doped with a wavelength converting material, said helical light-transmitting fiber defining a helical axis, said helical light-transmitting fiber axially aligned with said light source, said helical light-transmitting fiber biasing said light-transmitting button bulb element upwardly;

wherein a portion of light emitted by said light source passes through the open space between turns of the helical light-transmitting fiber and a portion of light emitted by said light source is received by the helical light-transmitting fiber and converted into a light of a predetermined color;

wherein depression of said button bulb element compresses said helical fiber and changes the percentages of the light from the light source and the light of a predetermined color in said mixed light, thereby changing the color of the mixed light that illuminates said button bulb element.

6. The illuminated button bulb of claim 5, wherein said housing mixes said portion of light emitted by said light source that passes through the open space between turns of the helical fiber and said portion of light converted into a light of a predetermined color, and directs said mixed light into said light-transmitting button bulb element to illuminate said button bulb element.

7. The illuminated button bulb of claim 5, wherein said housing is cylindrical.

8. The illuminated button bulb of claim 7, wherein said cylindrical housing is formed with a neck portion that has a smaller diameter than the diameter of the base of the helical fiber forming a horizontal step portion in the cylindrical housing for supporting the helical fiber.

9. The illuminated button bulb of claim 7, wherein said light source is a light-emitting diode (LED).

10. The illuminated button bulb of claim 9, wherein said helical light-transmitting fiber is conically shaped.

11. The illuminated button bulb of claim 10, wherein said LED has a lambertian beam pattern, further comprising a light-transmitting disk member positioned at an apex of the conical helical fiber to intersect a brightest portion of the beam pattern, said disk member doped with a wavelength converting material.

12. An illuminated button bulb comprising:

an elongated housing having a bottom wall and side walls extending upwardly from said bottom wall, said bottom wall and said side walls defining a cavity and an open top;

an elongated light-transmitting button bulb element having a base portion and an upper portion, said base portion received in said housing cavity and retained by said housing side walls, said upper portion extending upward through said housing open top;

a plurality of light sources arranged linearly in said housing cavity; and a plurality of helical light-transmitting fibers positioned in said housing cavity such that a helical light-transmitting fiber is positioned around each light source, each helical light-transmitting fiber being doped with a wavelength converting material, each helical light-transmitting fiber defining a helical axis, each helical light-transmitting fiber axially aligned with each respective light source, each helical light-transmitting fiber biasing said elongated light-transmitting button bulb element upwardly;

wherein a portion of light emitted by each light source passes through the open space between turns of each respective helical light-transmitting fiber and a portion of light emitted by each light source is received by each respective helical light-transmitting fiber and converted into a light of a predetermined color;

wherein said housing mixes each portion of light emitted by each light source that passes through the open space between turns of each respective helical fiber and each portion of light converted into a light of a predetermined color, and directs said mixed light into said elongated light-transmitting button bulb element to illuminate said elongated button bulb element; and wherein depression of said elongated button bulb element compresses said plurality of helical fibers and changes the percentages of the light from said plurality of light sources and the light of a predetermined color in said mixed light, thereby changing the color of the mixed light that illuminates said elongated button bulb element.

13. The illuminated button bulb of claim 12, wherein said plurality of light sources are a plurality of LED light sources.

14. The illuminated button bulb of claim 13, wherein each said helical light-transmitting fibers is conically shaped.

* * * * *